United States Patent [19]

Wood

[11] 3,851,299

[45] Nov. 26, 1974

[54] DATA PROCESSING SYSTEMS

[75] Inventor: David E. Wood, Schenectady, N.Y.

[73] Assignee: General Electric Company, Schenectady, N.Y.

[22] Filed: Dec. 15, 1961

[21] Appl. No.: 160,700

[52] U.S. Cl. .................... 340/3 R, 340/3 D, 343/8

[51] Int. Cl. .................... G01s 7/54, G01s 9/66

[58] Field of Search .......... 343/5, 17.1, 100.7, 113, 343/8; 340/3, 5, 6, 16, 15, 15.5, 173, 172.5; 235/181

[56] References Cited

UNITED STATES PATENTS

| | | | |
|---|---|---|---|
| 2,243,730 | 5/1941 | Ellis | 181/0.5 |
| 2,712,415 | 7/1955 | Piety | 235/181 |
| 2,839,149 | 6/1958 | Piety | 181/0.5 |
| 3,030,021 | 4/1962 | Ferre | 235/181 |

*Primary Examiner*—Richard A. Farley
*Attorney, Agent, or Firm*—Jerome C. Squillaro; Joseph T. Cohen

EXEMPLARY CLAIM

1. A data processing system including in combination:

1. first recording means for receiving and recording on a recording medium the signal imputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array,
2. a first light source positioned adjacent the recording medium for imaging a light beam through the tracks on the medium,
3. beam forming mask means positioned over said recording medium for disposing over the recorded tracks in a selected sequence masks representing optimum signal output from each elemental point of a selected range of view of the array of signal pick-up devices,
4. first electro-optical conversion means for converting the light passing through both the record track and the mask into an electric output signal representative of coincidence between the mask and the track record at points where such coincidence occurs,
5. second recording means operatively coupled to said first electro-optical conversion means for recording on a recording medium a plurality of tracks of light modifying marks representative of the output signals generated by the beam forming process from each elemental point examined,
6. a second light source positioned to direct light through the last mentioned recording medium at least in the portion where said light modifying tracks are formed,
7. a mask having a coded series of light modifying marks formed thereon representing the signal with which correlation is sought,
8. optical means for optically imaging the light passing through all of the tracks of light modifying marks in the recording medium upon the mask,
9. light separating means having the light images that have passed through both said recording medium and said mask impinging thereon for separating the light images from each of the individual tracks, and
10. second electro-optical converting means for each of the individual tracks having said separated light beams imaged thereon for converting the light image into output electric signals representative of correlation between the mask and individual tracks on the recording medium.

18 Claims, 27 Drawing Figures

Inventor
David E. Wood
by Charles W. Helzer
His Attorney

Inventor
David E. Wood
by Charles W Helzer
His Attorney

Inventor
David E. Wood
by Charles W. Helzer
His Attorney

Inventor:
David E. Wood,
by Charles W. Helzer
His Attorney.

Fig. 14.
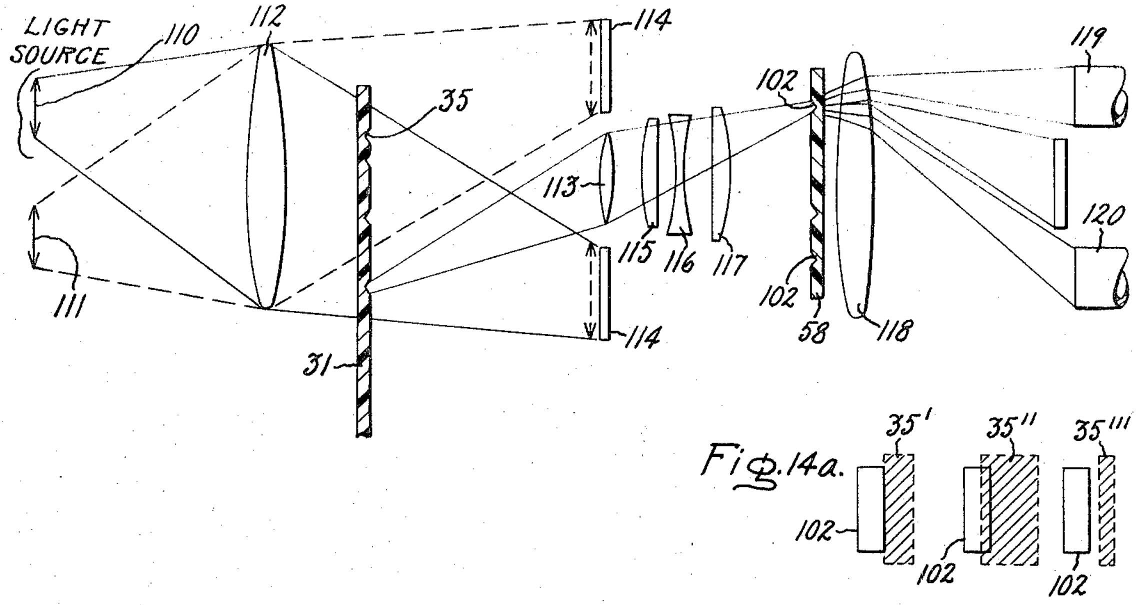
Fig. 14, Fig. 14a.
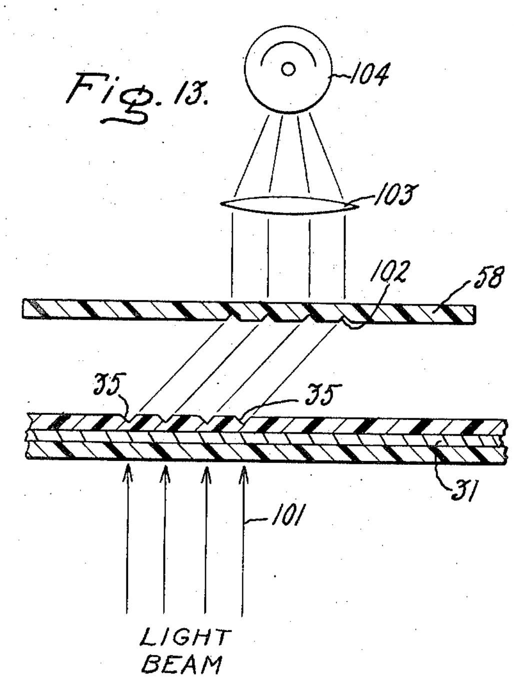
Fig. 13.
Fig. 12.
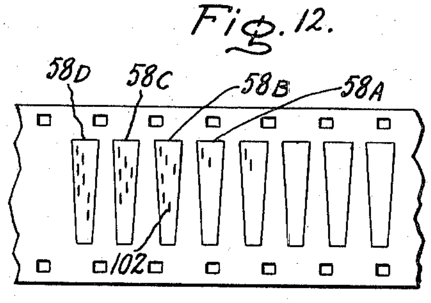
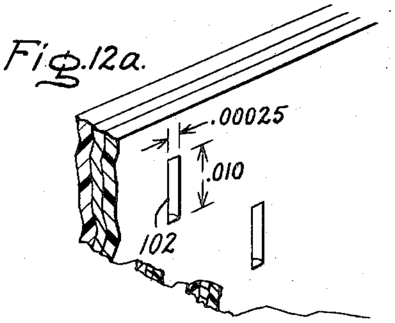
Fig. 12a.
Inventor:
David E. Wood,
by Charles W. Helzer
His Attorney.

Inventor:
David E. Wood,
by Charles W. Helzer
His Attorney.

Inventor:
David E. Wood,
by Charles W. Helzer
His Attorney.

DATA PROCESSING SYSTEMS

This invention relates to a data processing system.

More particularly, the invention relates to a data processing system for use in processing incoming signals from an array of signal input devices.

With present date long range sonar and radar search equipments which employ large arrays of antenna elements for receiving the echo signals being returned from a target, the problem of processing the returned signal for deriving intelligence concerning the characteristics of a target such as range, elevation, azimuth, velocity, and so forth, has become extremely complex. The present data processing system was devised primarily for use in processing such information. For this reason, the invention is described for use in conjunction with a long range sonar equipment, although it is to be understood that the use of the data processing equipment is not limited to sonar applications but may be used in a wide number of different data processing applications where large quantities of data to be processed are involved.

It is therefore a primary object of the present invention to provide a new and improved data processing system for use in processing large quantities of incoming signals supplied from an array of signal input devices, and deriving useful information relating to phenomena being monitored by the array of signal input devices.

In practicing the invention, a data processing system is provided which includes a first recording means for receiving and recording on a thermoplastic film recording medium the signal inputs from an array of signal input devices. The recording medium is adapted to have its light modifying characteristics changed by the recording means in accordance with the signal inputs so that a plurality of tracks of light modifying marks are formed on the recording medium with each track representing the signal supplied from one signal input device of the array. A first light source is positioned adjacent the recording medium for imaging a light beam through the tracks on the medium. A beam forming mask means is positioned over the recording medium for disposing over the recorded tracks in the medium in a selected sequence, masks representing optimum signal output from each elemental point of view of a selected range or view of the array of signal pick-up devices. In a preferred form of the invention, optical means are positioned intermediate the first light source and the beam forming mask means for imaging the light passing through all of the tracks in the light modifying marks on the recording medium upon the mask. This optical means preferably includes an image magnifying means, and means for varying the magnification of the image magnifying means whereby the size of the light image of the light modifying marks on the recording medium may be varied with respect to the size of the light modifying marks on the mask. First electro-optical conversion means are positioned adjacent the recording medium for converting light passing through both the records and track and the mask into an electric output signal representative of coincidence between the masks and the track record at points where such coincidence occurs. The second recording means are operatively coupled to the output of the first electro-optical conversion means for recording on a similar thermoplastic film recording medium a plurality of tracks of light modifying marks representative of the output signals generated by the beam forming process from each elemental point examined in the range of view of the array. A second light source is positioned to direct light through the recording medium at least where the light modifying tracks are formed. A second mask having a coded series of light modifying marks formed therein is positioned to have light passing through the second mentioned tracks impinge upon it. This second mask has a series of light modifying marks formed in accordance with the signal with which correlation is sought. Additional optical means may be supplied for imaging the light from the second set of tracks upon the second mask, and this second optical means likewise preferably has image magnifying means together with means for varying the magnification of the image magnifying means thereby allowing for a Doppler scan of the signal being correlated. Light separating means are positioned adjacent the second mask so that light images which have passed through both the second set of record tracks and masks impinge thereon and are separated. Second electro-optical converting means are positioned on the output side of the light separating means so that the separate light beams representative of the individual track of information are imaged thereon and are converted into output electric signals representative of correlation between the mask and the individual tracks on the recording medium.

Other objects, features and many of the attendant advantages of this invention will be appreciated more readily as the same becomes better understood by reference to the following detailed description when considered in connection with the accompanying drawings, wherein like parts in each of the several figures are identified by the same reference character, and wherein.

Figures 3, 3A:
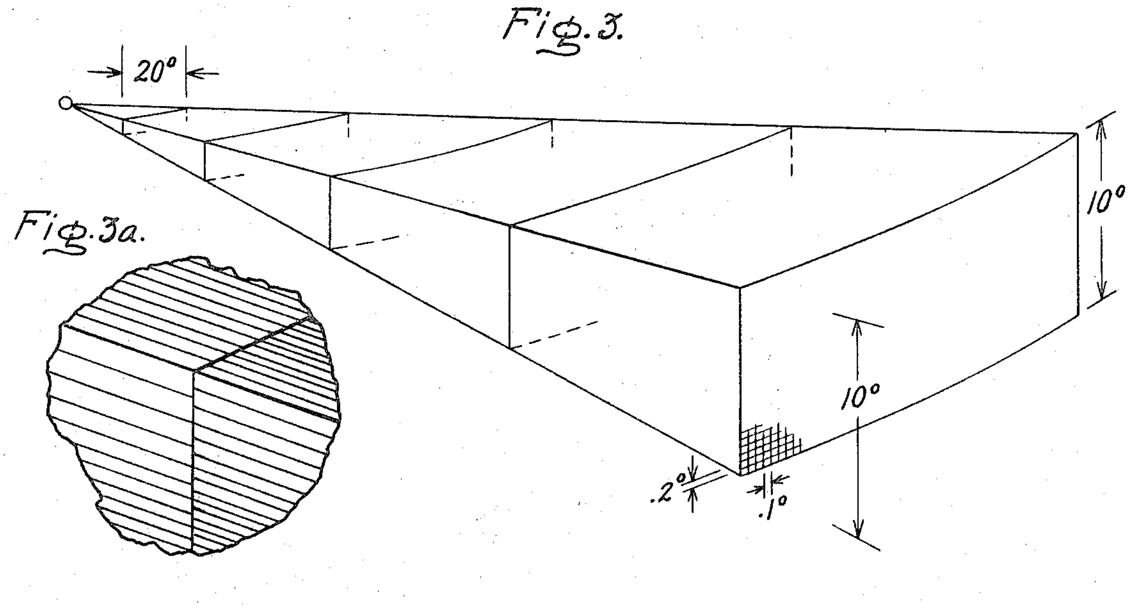
FIG. 3 is a schematic diagram illustrating the field of view of the array of signal input devices shown in FIG. 1.
Figures 1, 2, 4:
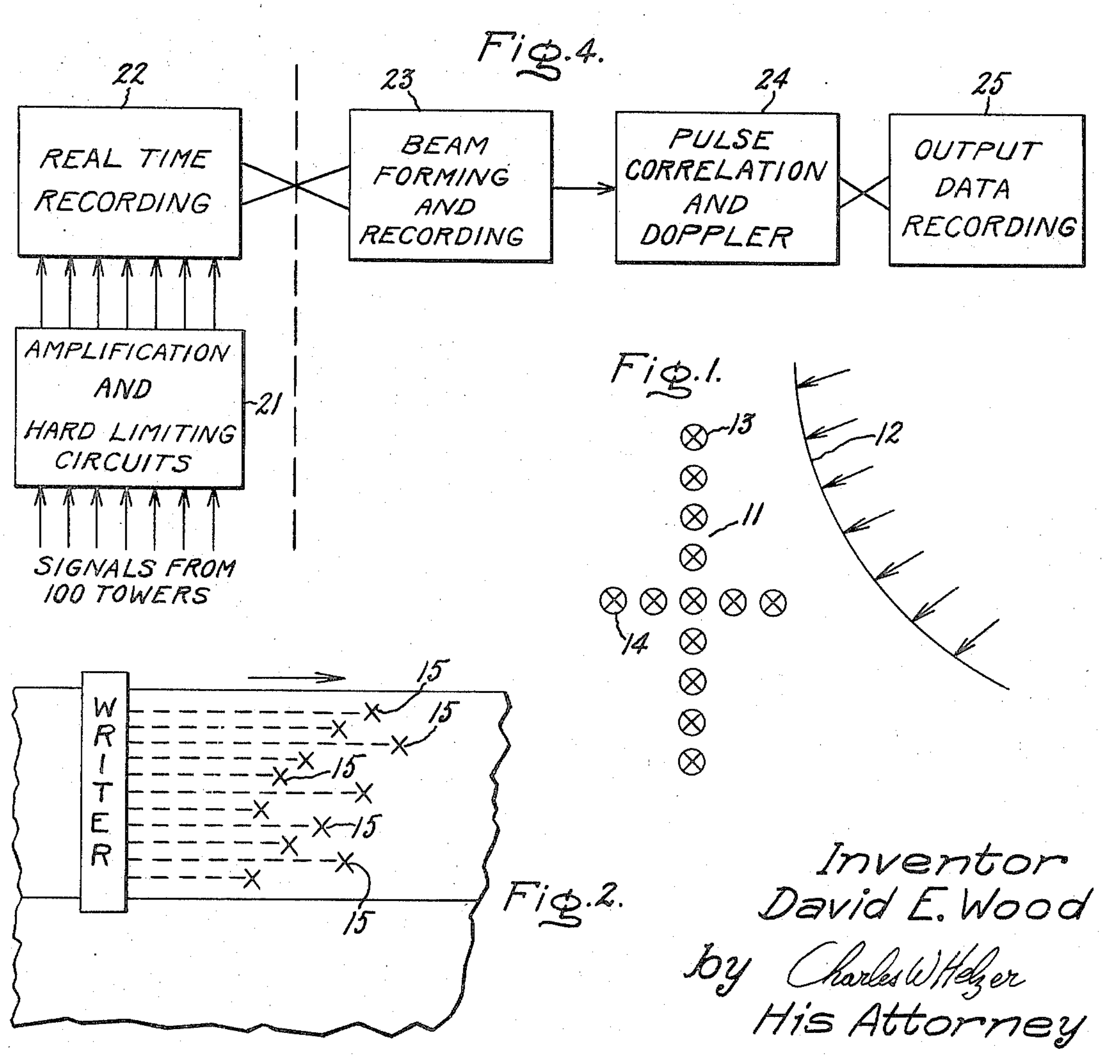
FIG. 1 is a diagrammatic layout of a sonar signal receiving array formed by a plurality of sonar receiving towers, and illustrates the relation of the array with respect to an incoming sound wave.
FIG. 2 is a plan view of a recording produced by the first recording operation of the data processing system comprising the invention.
Figures 5, 5A:
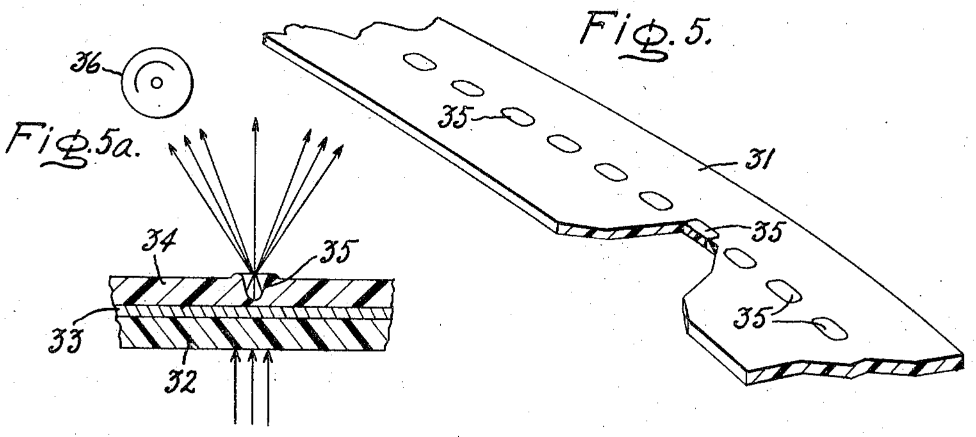
Figure 6:
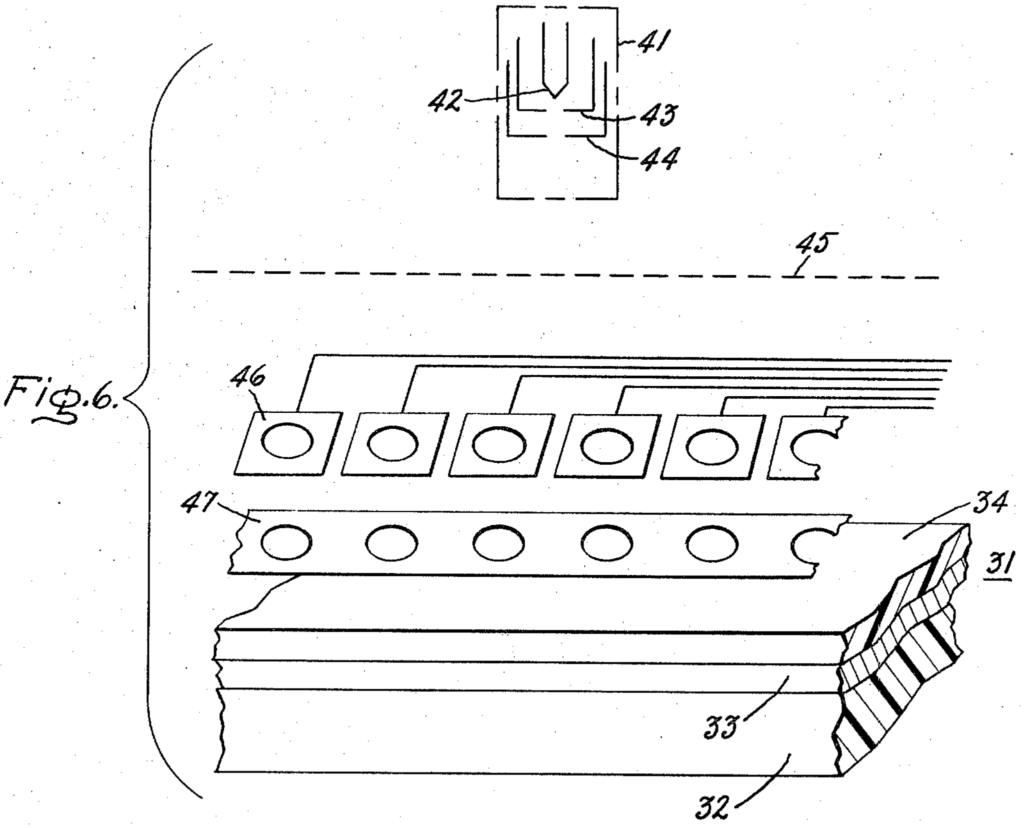
Figure 7:
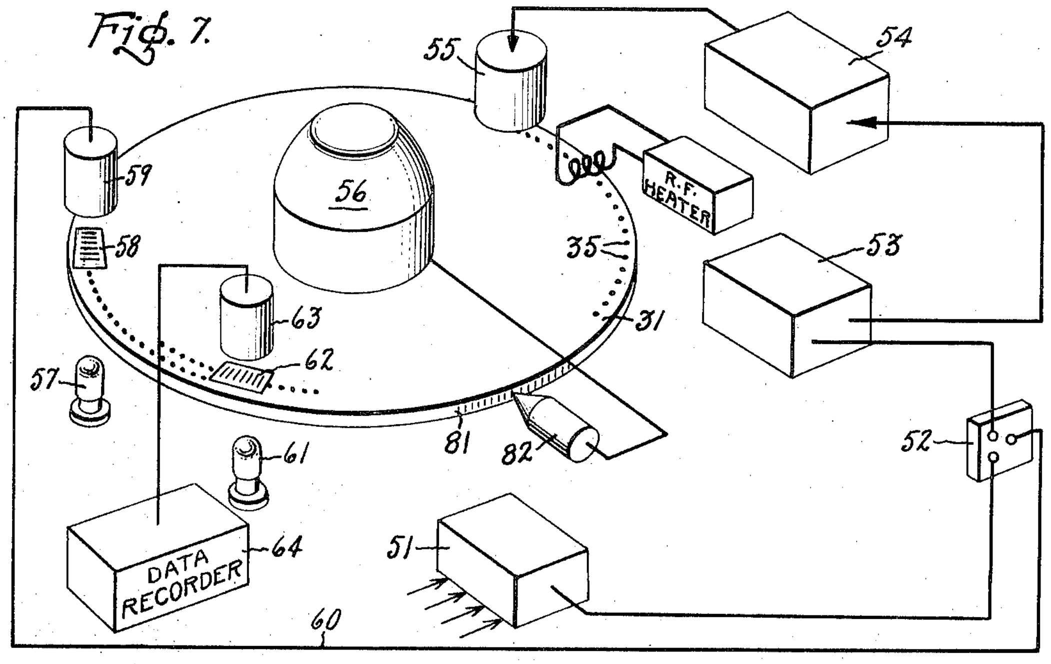
Figure 8:
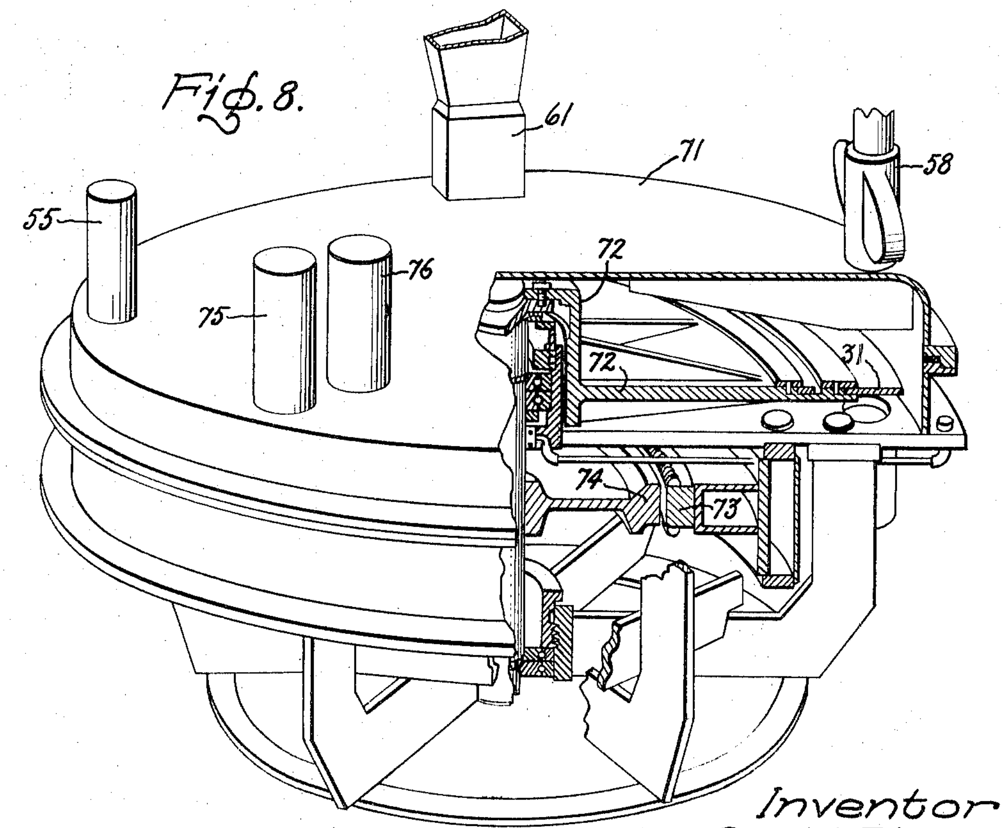
Figure 9:
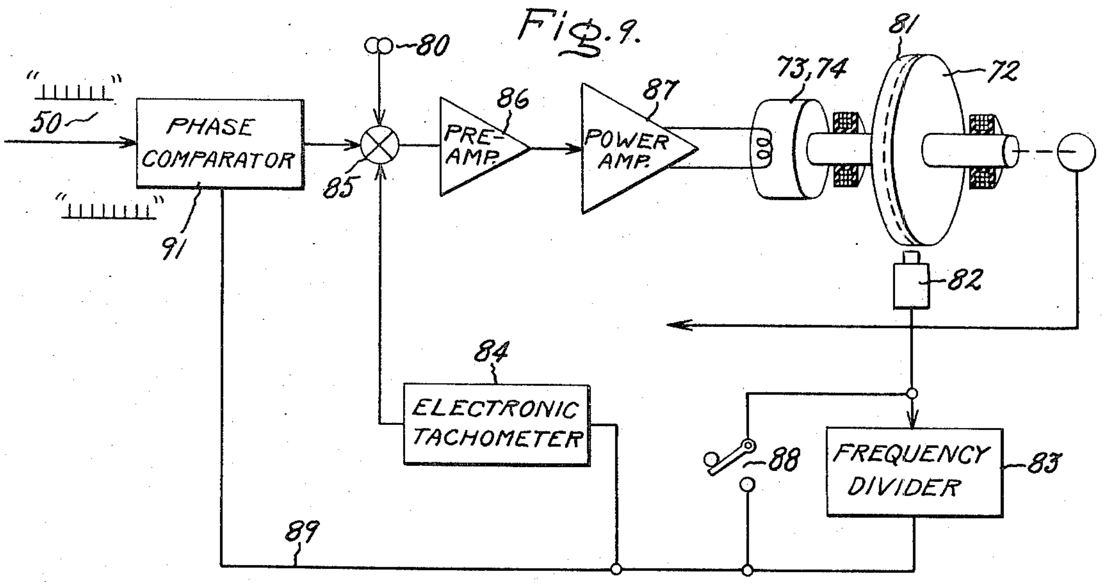
Figure 10:
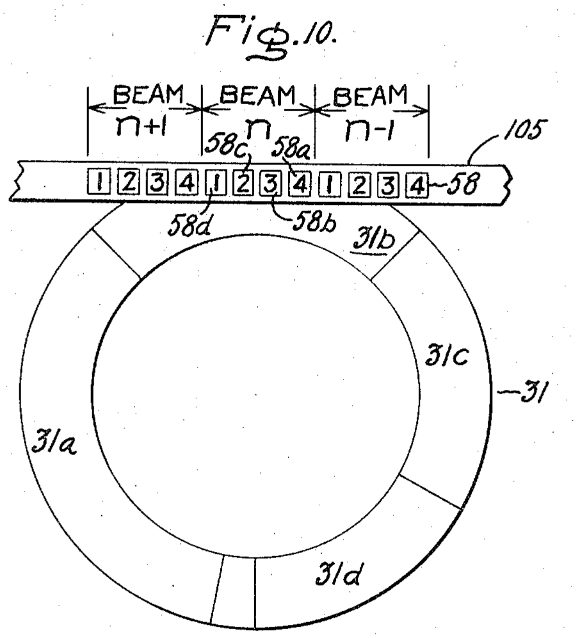
Figure 11:
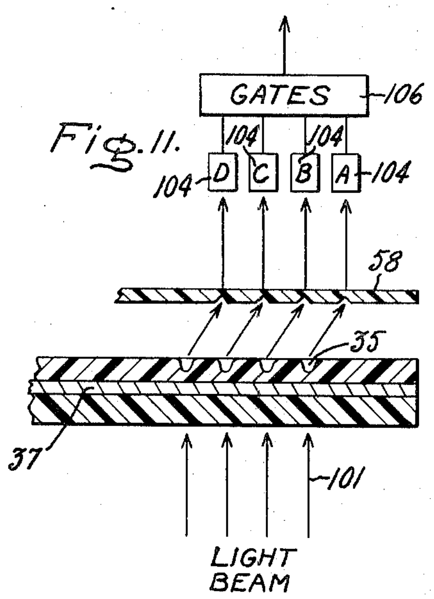
Figures 15, 16A, 16B, 16C, 17, 18, 21:
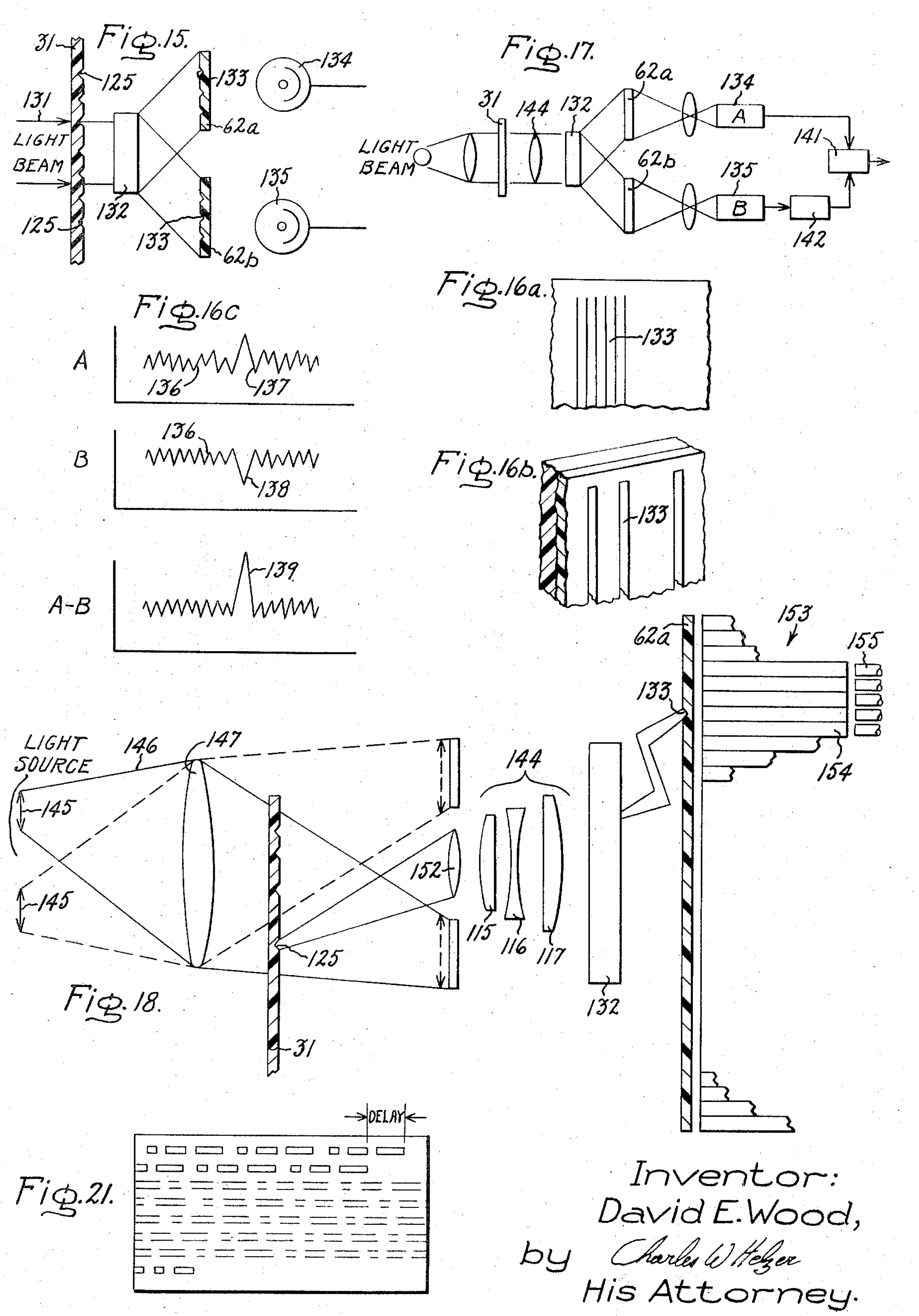

FIG. 3*a* is a greatly magnified perspective view of a portion of the search sector illustrated by FIG. 3;

FIG. 4 is a functional block diagram of the data processing system comprising the invention;

FIG. 5 is a perspective view of a partially broken away strip of thermoplastic film recording medium having a track of light modifying marks formed thereon by electron writing;

FIG. 5*a* is an exploded sectional view of the thermoplastic film recording medium shown in FIG. 5 and illustrates the light refracting properties of the light modifying marks formed on the recording medium;

FIG. 6 is a schematic arrangement of a multiple track electron gun used for writing multiple tracks of data on a thermoplastic film recording medium;

FIG. 7 is a functional block diagram of a data processing system constructed in accordance with the invention;

FIG. 8 is a partially broken away perspective view of a recording turntable comprising the heart of the data processing system illustrated in the functional block diagram of FIG. 7;

FIG. 9 is a functional block diagram of a constant speed control system used for maintaining the speed of the turntable used in a data processing system of FIG. 7;

FIG. 10 is a schematic arrangement of the turntable and beam forming masks showing the relation of these two elements of the data processing system;

FIG. 11 is a sectional view of a portion of the turntable and beam forming masks and shows the relation of these two elements to a plurality of photocell signal generating devices used in the beam forming process of the system;

FIG. 12 is an enlarged plan view of the beam forming masks shown partially in FIG. 10 of the drawings; arranged FIG. 12*a* is a greatly magnified view of the thermoplastic film masks illustrating the relative size of the light modifying marks formed on these masks by electron writings;

FIG. 13 is a schematic diagram of the beam forming light optic system;

FIG. 14 is a detailed side view of the beam forming light optic system shown schematically in FIG. 13;

FIG. 14*a* is a diagrammatic view showing the effect of the anamorphic zoom lens assembly;

FIG. 15 is a schematic arrangement of the basic pulse correlation light optics system;

FIG. 16*a* is a plan view of a fragmentary part of the pulse correlation mask used in the system of FIG. 15;

FIG. 16*b* is a greatly magnified perspective view of a portion of the correlation mask shown in FIG. 16*a;*

Figure 19:
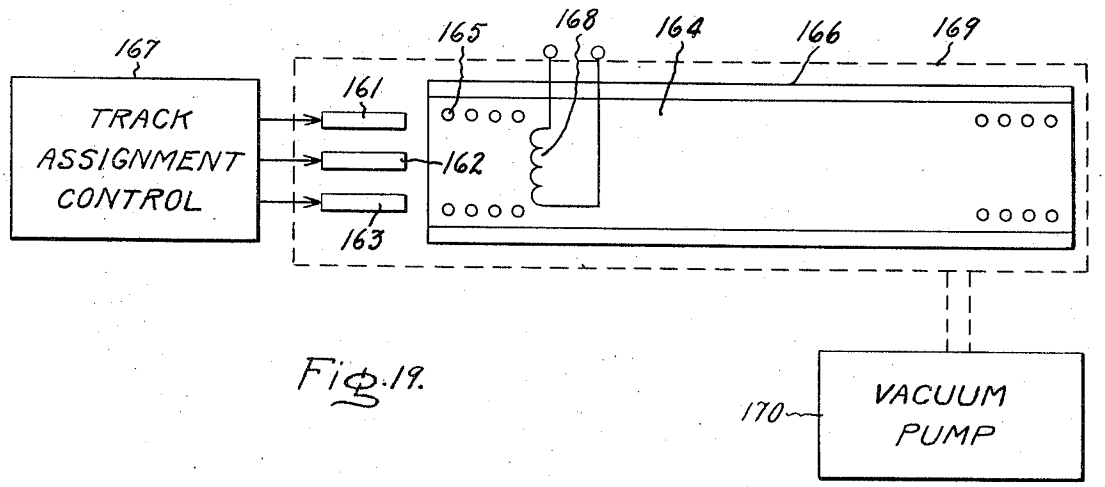
Figure 20:
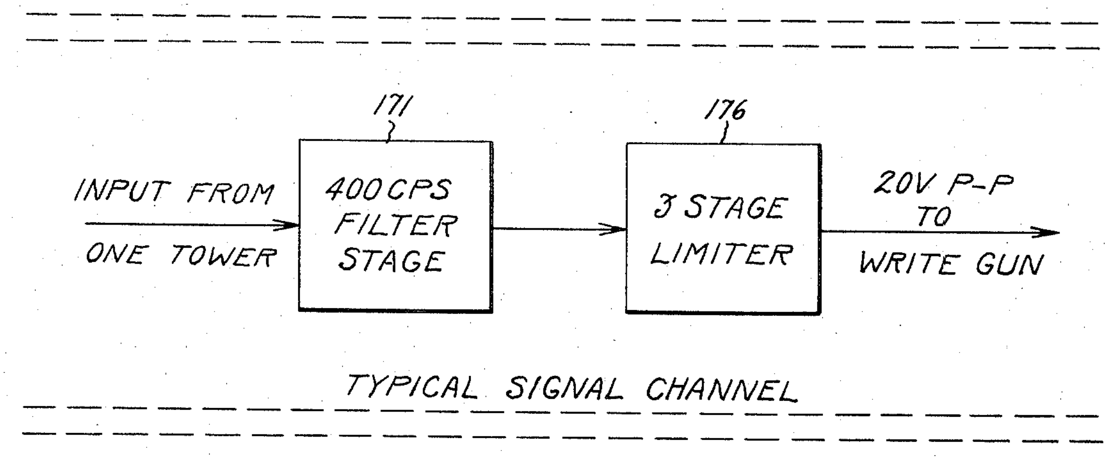

FIG. 16*c* is a series of wave-forms plotting voltage versus time illustrating the mode of operation and the nature of the signals derived by the pulse correlation system illustrated schematically in FIG. 15;

FIG. 17 is a schematic optical arrangement showing the relation between the light optics and the electrical converting circuit in schematic block diagram form;

FIG. 18 is a detailed schematic view of a portion of the pulse correlation light optics system;

FIG. 19 is a functional block diagram of an output data recorder comprising a part of the data processing system;

FIG. 20 is a functional block diagram of the signal input stage coupled intermediate the signal array towers and the first recording device of the data processing system; and FIG. 21 is a plan view of an alternative construction of a combined beam forming and pulse correlation mask that can be used in place of the beam forming mask shown in FIG. 12.

THEORY OF OPERATION

The present data processing system was devised for use primarily in processing data received from a long range sonar system which is designed to keep large sectors of the ocean under surveillance. This long range sonar system is designed to detect and locate targets on or beneath the surface of the ocean within a sector extending hundreds of miles in range and of comparable breadth. Sonar detection over such long ranges requires that the returning target signal be maximized and both signal amplitude and frequency resolution be optimized. This requires that the angular and range resolution elements be quite small since small angular resolution both limits the volume seen in reception, and helps prevent destructive interference between target echoes received over different paths. With respect to range resolution, this resolution should be comparable to the echo source dimensions.

High angular resolution is achieved in long range sonar systems by the use of a very large array of receiver towers, each consisting of a group of hydrophones secured to a tower. Such an array of sonar receiving towers is illustrated schematically in FIG. 1 of the drawings. This array may extend for perhaps 2 miles in each direction and is composed of hundreds of receiving towers. An array of this nature can produce an angular resolution element as small as one-tenth of a degree in azimuth, and about two-tenths of a degree in elevation. Such an array of receiving towers can be made to look in a desired direction by combining the tower output signals in a way which compensates for the differences in time of arrival at different array towers. This requires that for each angular resolution increment looked at, there is a corresponding set of "beam forming" delays which must be employed in combining the receiving tower output. This fact can be better appreciated from an examination of FIG. 1, wherein the array of receiving towers is shown at 11, and an incoming returning target signal wavefront is illustrated at 12. It can be appreciated that the incoming target signal wavefront will be received by the receiving tower 13 of the array, for example, at a point in time far in advance from the receiving tower 14 receiving the same target signal wavefront. If the receipt of the signal at each of the receiving towers in the receiving tower array were plotted in accordance with its time of receipt on a constantly moving recording medium, then the recorded plot would appear as shown in FIG. 2 of the drawings, wherein each of the X's, such as shown at 15, represents the signal output from a respective receiving tower in the array. This recorded signal is processed as described above so that the receiving array is made to look at a small volume containing a target for the longest possible time.

The beam forming delays are complicated by the fact that the delays required to make the receiving array "look" at a particular angular resolution element are a function of range. This stems from the fact that the curvature of the returning sound wavefronts will affect the delays in signal arrival at the receiving array to a degree which depends upon the shortness of the range. Hence, to search a specific angular increment at a given range, the received signal processing must typically provide a different family of beam forming signal delays for each of several range zones. Suitably high range resolution can be achieved if the target echoes returning from a long transmitted pulse having a coded modulation can be added in phase. This coherent in-phase addition of the coded signal returns from a long transmitted pulse would enhance the target signal because random reverberation adds less effectively. The coding, such as suitable random noise, frequency modulation and the like, effectively divides the long transmitted pulse into parts corresponding to the range resolution desired. The coherent addition of the parts of the received signal can then be acomplished by comparing the changing signal returns with a suitable replica of the coded long transmitted pulse. This process of correlation causes an output signal to be generated when the phase relations of a section of the received signal corresponds closely to the coded long transmitted pulse. A problem of correlation which is turned to advantage in the present data processing system is its sensitivity to Doppler effects which change the duration of the received signal pulses. Doppler frequency shifts due to target motion require that the correlation process be repeated so as to stretch or shorten the coded pulse replica to scan the velocity spectrum of any potential target. This type of correlation processing not only provides a high range resolution but also serves as a narrow band pass filter in appearance.

From the foregoing description it can be appreciated that the long range sonar system contemplated requires a new and improved signal processing system with capabilities far greater than exist in presently available systems. The search function to be carried out will involve scanning the return from thousands of angular directions by separate beam forming combinations of signals from a receiving tower array. The output of each beam combination then must, in turn, be scanned possibly hundreds of times by a pulse correlation stage to cover the Doppler spectrum in narrow increments. Accordingly, literally millions of separate operations have to be performed to process the return from each sonar transmission. The present data processing system was designed to achieve this end.

The purpose of a long range sonar system such as that with which the present data processing system is intended to be used, would be the detection and tracking of surface and subsurface craft travelling in large belts of ocean off of the coast of the U.S. It is anticipated that one such system would consist of a single high powered sonar transmitter and a single receiving array of sonar hydrophone receiver elements mounted on towers. In order to cover the entire ocean off of the coast of the U.S., it would, of course, be necessary to arrange such systems side-by-side so that the belts of ocean covered by each single system would tend to scan the whole ocean area. The present embodiment of the data processing system described, however, is intended to be used only with a single, long range sonar system consisting of the single, high powered sonar transmitter and the single receiving array of sonar receiving elements. This single sonar search system is proposed to search a sector of ocean 20° wide in azimuth, and extending as far as 500 miles out from the receiving array. It is, of course, to be understood that this receiving sector can be readily modified by appropriate adjustment to the receiving array, and that the data processing system would, accordingly, be corrected as determined by the specific requirements of a certain application of the system. A typical search pattern is illustrated schematically in FIG. 3 of the drawings, wherein it is shown that the data processing system provided by the present invention is capable of dividing the 20° wide azimuth field of search into 1/10th° angular beam elements and 2/10ths° elevational beam elements, and that each angular beam thus comprised is, in turn, divided into a number of range zones. For the present purposes, four such range zones are described, and it is anticipated that the outermost of these range zones, for example, the outer 125 miles in the proposed system, would consist of some 1,000 angular beam elements to cover the entire outer sector. It is proposed that the inner range sections would have fewer numbers of angular beam elements in order that each angular beam element scans an equivalent area in terms of linear measurement units of the sector being monitored. Such an arrangement is illustrated schematically in FIG. 3*a* of the drawings which comprises a blown-up view of an encircled portion of the sector being scanned by the receiving system of the array.

High range resolution of the system has to be achieved in order to limit reverberation to a range interval comparable to some average echo source size. This range increment ordinarily will be much shorter than the long transmitted sonar pulses envisioned in the long range sonar system and, therefore, it is anticipated that the long transmitted sonar pulses will be coded into sections. A returning echo will exhibit the same coding modulation, and detection of an echo can be accomplished by translating a record of the returned signal past a record of the code. When the polarities of the echo signal and the coded reference signal are found to correspond, an output signal will be generated. The codes are chosen so that the correspondence of polarities is high only over the length of the range resolution element to be surveyed. This process of pulse correlation is provided for in the present data processing system. Pulses with bandwidths of 100 cycles and a duration of up to 60 seconds may be detected by correlation with the desired range resolution by this system.

Doppler frequency resolution will also be used to determine target velocity relative to the receiver array, and to reject reverberation outside the frequency increment under examination. This frequency resolution can be obtained by utilizing a characteristic of the correlation process just described. In utilizing this characteristic, it should be remembered that an effect of target velocity is to change the length as well as the frequency of a returning echo pulse, and that correlation by comparison of the received signal and the reference signal records requires that the lengths of the records correspond within a fraction of a cycle of modulation frequency. For long pulses, the Doppler effect can change the length of the received pulses by hundreds of cycles. Hence, for a given length of reference signal record, there is only a narrow frequency increment over which correlation can occur. In order to search for targets at expected Doppler shifts, it is necessary to repeat the correlation process with as many different code reference record lengths as there are increments in the range of Doppler frequencies to be scanned. For long transmitted pulses, this may involve hundreds of Doppler increments and, therefore, hundreds of repeated correlation operations are required. The proposed data processing system handles these repetitions very simply, as will be described hereinafter.

OVER-ALL DATA RECORDING SYSTEM

FIG. 4 of the drawings shows a functional block diagram of the over-all data processing system constructed in accordance with the invention. In this system, the signal inputs from, say, 100 sonar receiving towers, are supplied separately to appropriate circuitry for amplification and hard limiting of each of the signals. The hard limiting process is designed to emphasize the polarity information in the incoming signals and to eliminate amplitude effects. This process is carried on in the circuits indicated by the block 21 and the electrical outputs from all 100 channels are electrically supplied to a real time recording device indicated at 22. The real time recording device 22 will record the signal output from each of the 100 signal towers on 100 tracks formed in a thermoplastic film recording medium in a manner to be described more fully hereinafter. By real time recording is meant that the signal inputs are recorded on the thermoplastic film recording medium in a precise one-to-one relation with respect to time that they are received from the receiving signal arrays. Hence, if the time required for a single long transmitted sonar pulse to go to the end of the range being searched and return is 22 minutes, then the real time recording of the pulse takes 22 minutes. Following the real time recording of the incoming target signals, the thermoplastic film recording medium is speeded up for the subsequent signal processing operations described hereinafter. The 100 tracks formed by the real time recorder 22 are optically read out and supplied in the form of a light image to the beam forming and recording circuitry indicated at 23. This circuitry accomplishes the beam forming operation mentioned above, and results in developing in any one single process some 200 signals representing the 200 azimuth angle elements looked at in a single processing operation. These 200 tracks are then optically read out by the pulse correlation circuitry 24 which performs the correlation operation outlined briefly above and to be described more fully hereinafter. The signal outputs resulting from the pulse correlation process are then supplied to the output data recorder 25 where they are recorded for display and further study. It should be noted that the beam forming process accomplishes the beam forming operation for only 200 azimuth elements in a single azimuth fan extending two-tenths of a degree in elevation and 20° in azimuth. It is anticipated that subsequent to processing the returning signals from one such azimuth fan, the angle of look of the receiving array will be shifted two-tenths of a degree in elevation for successsive periods of operation until the entire sector of 20° in azimuth and 10° in elevation has been surveyed.

With respect to the construction of the amplification and hard limiting circuits 21, these circuits are of conventional construction and it is not deemed necessary to describe them in detail at this point of the specification, but they will be described more fully at the end of the disclosure.

The real time recorder 22 will employ a thermoplastic film recording medium, and the signals from each receiving tower will be recorded on a separate track on this recording medium. Thermoplastic film recording was first described in U.S. Pat. application Ser. No. 8842, filed Feb. 15, 1960, entitled "Method, Apparatus and Medium for Recording" W. E. Glenn, Inventor, assigned to the General Electric Company, and for a more detailed description of this recording technique reference is made to the Glenn application. Reference is also made to the U.S. Pat. No. 3,063,872, entitled "Recording Medium and Polysiloxane and a Resin Mixture Therefor," Edith M. Boldebuck, inventor, issued Nov. 13, 1962; U.S. Pat. No. 3,008,066, entitled "Information Storage System," Sterling P. Newberry, inventor, issued Nov. 7, 1961; and U.S. Pat. No. 2,985,866, entitled "Information Storage System," J. F. Norton, inventor, issued May 23, 1961, all assigned to the General Electric Company. A fragmentary section of a thermoplastic recording disk is indicated at 31 in FIG. 5 of the drawings. The physical construction of this disk 31 is shown more fully in FIG. 6 of the drawings, wherein it can be seen that the thermoplastic disk itself comprises a supporting backing 32, such as Mylar or glass, which is transparent to light. Disposed over the transparent backing 32 is a transparent conductive coating 33, the purpose of which will be appreciated more fully hereinafter, and formed over the transparent conductive coating 33 is a thermoplastic film layer 34. Suitable thermoplastic layers have been described in the above-identified copending Glenn application and, hence, will not be identified further. It should be noted, however, that the characteristics of this material are such that they will retain an electron charge when electrons are written thereon in intelligence conveying patterns. These patterns, when subjected to heat from an infrared or radio frequency heating device acting on the transparent conductive coating, will form a depression or light modifying mark 35 in the surface of the thermoplastic film recording medium as best shown in FIGS. 5 and 5*a* of the drawings. The existence of the depressions or marks 35 indicates that electrons have been written at that point in accordance with the signal being recorded. The layer itself will not form the depression 35 unless it is subjected to heat in the presence of the electron patterns written thereon. Upon subjecting the thermoplastic layer to heat, the layer becomes sufficiently fluid for the electrostatic forces due to the electrons to form the depression in the layer of the thermoplastic film. Hence, upon allowing the film to again solidify from its fluid or semi-liquid state, the depression will become permanent. It should be noted at this point that further heating of the thermoplastic film in the absence of electrons will erase the depression so that the light modifying marks 35, shown in FIG. 5, may be subsequently erased simply by heating the thermoplastic film. The precise nature of the light modifying marks 35 is illustrated more fully in the greatly magnified view of a mark 35 shown in FIG. 5*a* of the drawings. This figure grossly exaggerates the size of the light modifying marks 35, but does serve to illustrate that the light modifying mark 35 constitutes a depression in the surface of the thermoplastic film layer 34 which, upon having light directed therethrough, will serve to refract the light in the manner indicated by the arrows emanating from each side of the groove 35. It is this light refracting characteristic which allows the groove to record the presence of a signal at a particular point on the surface of the thermoplastic recording medium, and then, of course, the absence of the groove will record the absence of a signal. Accordingly, if the incoming signals from each of the receiving towers in the array is allowed to turn on an electron beam at a particular point along the length of the recording medium 31 when there is a positive polarity signal present, the light modifying marks 35 will be formed in the thermoplastic film recording medium upon subsequent heating to indicate the presence of the positive polarity signal pulse at this point of time in the returning signal. At this point in the description it might be well to note that in order to read out a signal previously recorded on the thermoplastic film recording medium, a phototube, indicated at 36 in FIG. 5*a*, is positioned to one side of a light source positioned under the thermoplastic film recording medium so that in the presence of a light modifying mark 35, light will be refracted from the light source onto the phototube 36. The phototube 36 will then develop an output electric signal pulse to thereby indicate the presence of a positive polarity signal at this point along the thermoplastic film recording medium.

A suitable electron gun design for writing multiple tracks of the light modifying marks 35 on a thermoplastic film disk is illustrated in FIG. 6. This multiple electron gun comprises an electron source 41 formed by a filament 42, a first accelerating grid 43, and an accelerating anode 44, positioned in axial alignment over the filament 42. The central openings in the accelerating grid 43 and accelerating anode 44 are sufficiently wide so that the electron source 41 emits a field of electrons that are directed through a collecting grid structure 45 toward a line of 100 control grids indicated at 46. Each of the control grids 46 is connected separately to an output from one of the sonar receiving towers through its associated amplifying and hard limiting circuitry so that each of the individual control grids 46 will modulate the electrons passing therethrough in accordance with the signal being received from its associated receiving tower. The collector grid 45 serves to collect secondary emission electrons and to provide a uniform field for all of the control grid apertures 46. Positioned under the individual control grids 46 is a focussing electrode 47 having a series of apertures, each one of which is individually aligned with the aperture in its associated control grid 46.

During the writing operating, the transparent conductive film 33 of the thermoplastic film recording medium 31 will be grounded. In operation, the electron source 41 will supply somewhere in the neighborhood of 50 microamperes of beam current in order that a maximum of about one-tenth of a microampere will be available in each of the control grid apertures 46. No deflection of the electron beams is required and this greatly simplifies the electron gun design. By this arrangement, in the absence of a signal on the control grid element 46, no electrons will be directed therethrough, and through the focussing aperture onto the thermoplastic film recording medium. However, in the presence of a signal on the control grid 46, electrons will be accelerated through the grid aperture and through the focussing aperture 47 onto the thermoplastic film recording medium. Hence, upon subsequent heating, a light refracting depression or mark 35 will be formed in a thermoplastic film recording medium at this particular point. It is, of course, to be understood that the line of control grids 46 will run transverse to the recording medium as it moves under the electron rider so that all of the tracks of light modifying marks for all of the receiving elements of the receiving array will be written simultaneously. Hence, the output side of the writing and subsequent heating stage of the recording will be some 100 tracks of light modifying marks 35 produced on the surface of the thermoplastic film recording medium 31 in the manner illustrated in FIG. 2 of the drawings.

The functional block diagram of the over-all system employing the real time recorder and showing its relation to a thermoplastic film recording disk, a beam forming and recording stage, and a pulse correlation stage is illustrated in FIG. 7. In the system shown in FIG. 7, the several signal inputs from the respective receiving towers in the receiving array are supplied to respective amplifying channels in an amplifier shown at 51. The output from the amplifier is then supplied through the hard limiting circuit 53 to a write amplifier 54. The output from the write amplifier is then supplied to an electron writing gun 55, which is similar in construction to the electron gun shown in FIG. 6 of the drawings. The electron gun 55 is disposed over rotatable disk 31 having a thermoplastic film recording medium on its upper surface, and adapted to be rotated by a motor drive 56. In the particular arrangement disclosed, it is intended that the motor 56 be capable of driving the disk 31 at a first predetermined speed related to the timing required for the transmitted sonar coded pulse to reach the end of the range being surveyed and return to the receiving array while recording is in process. During this recording phase of operation, a plurality of reference marks 81 on the periphery are read out by a photocell 82 which develops a speed control signal to accurately control the speed of rotation of the disk 31. It should also be noted that the circumference of the disk 31 at the point where the tracks 35 are being recorded, is related to the speed of rotation, and to the time required to completely record the returning echo signals from one long transmitted coded sonar pulse. Upon completion of the recording operation, the motor 56 is then speeded up for the subsequent beam forming and correlation processes. The beam forming process is carried out by a first light source 57 positioned under the rotatable disk 31 at the point where light produced by the source will be imaged through the light modifying marks 35, and through a beam forming mask illustrated schematically at 58 upon a suitable electro-optical converting device 59 such as the photocell detector. The signal output from the beam forming photocell detector 59 may then be supplied back through a conductor 61 and through a suitable switching device 52 to the input of the hard limiting circuit 53. The hard limiting circuit 53 then serves to limit the beam formed signals developed by the beam forming photocell 59, and supply them to the write amplifier 54 which, in turn, supplies appropriate writing signals to the writing gun 55. It is anticipated that the writing gun 55 will have some means for mechanically shifting the gun along the diameter of the disk 31 so that the beam formed tracks to be written will be placed parallel to the originally recorded tracks representative of the incoming signals. Alternatively, it would be possible to mount two additional writing guns adjacent the thermoplastic film recording disk 31 for separately writing the additional beam formed tracks. In the present example, it is anticipated there will be some 200 beam formed tracks where each track will represent the signal output from a particular angular segment of the azimuth fan being viewed by the receiving array. These 200 beam formed tracks are then passed over a pulse correlation station comprised by a second light source 61 positioned under the thermoplastic disk or turntable 31 so as to image light up through the 200 beam formed tracks previously written thereon by the writing gun 55. Light passing through these tracks is then imaged on a correlation mask 62 having light modifying marks formed therein in accordance with the transmitted coded sonar pulse and, hence, representative of the signal with which correlation is sought. Any light that passes through both the 200 beam formed tracks and the correlation mask 62 is then imaged on a second electro-optical converter comprising a series of photocells 63 which derive output electric signals representative of correlation between the beam formed tracks and the correlation mask 62. These output electric signals are then supplied to a conventional thermeoplastic film recording device 64 capable of recording simultaneously the output from all 200 individual tracks. Subsequent to processing one azimuth fan in the above described manner, the field of search or look of the receiving array is then made to step up two-tenths of a degree in elevation by appropriately changing the beam forming mask 58, and then the next azimuth fan is processed in the same manner. These operations are carried out through the entire range of elevation until the entire sector under surveillance has been processed in the foregoing manner.

A practical physical construction for the data processing system illustrated schematically in FIG. 7 is shown in FIG. 8 of the drawings. As can be readily determined from an examination of FIG. 7, the heart of the data processing system is the rotatable disk 31 of thermoplastic film on which the several tracks of signals are written for subsequent optical readout in either the beam forming or pulse correlation processes. For this reason, most of the components of the data processing system are built around the housing for the rotatable thermoplastic disk 31 as shown in FIG. 8. The housing 71 encloses a rotatable turntable 72 which has an annular thermoplastic recording disk 31 secured around its outer periphery. The annular thermoplastic recording disk 31 actually comprises an annular member fabricated in the manner described with relation to FIGS. 5 and 6 of the drawings, and is sufficientlly wide to accommodate at least the 100 record tracks representing the incoming signals as originally received, and the 200 record tracks derived by the beam forming process as outlined above. It is anticipated that these tracks will be recorded in concentric relation so that in effect each track is parallel with the remaining tracks in the set. The rotatable turntable 72 is suitably journalled within the housing 71 on a set of bearings, and is rotated by a multipole d.c. motor having its rotor 73 secured to the turntable, and its stator 74 secured to an axial post to which the rotatable turntable 72 is journalled. The motor 73,74 is controlled by a speed control system, not shown in FIG. 8, which will be described more fully hereinafter. The motor 73,74 serves to rotate the thermoplastic film recording disk 31 past the input writing gun 55 at a predetermined constant speed related to the timing of the sonar signals being transmitted and received, and the input writer 55 serves to record a plurality of tracks of light modifying marks on the thermoplastic film surface of the disk, there being one track for each of the signal receiving towers in the receiving array. Upon completion of the recording process as previously described, the motor 73,74 is speeded up. For example, during the recording process, one revolution of the recording disk 31 may require approximately 22 minutes for a recording disk having a diameter of 5 feet. Upon completion of the recording process, however, the speed of rotation of the turntable 72 may be increased to something like 300 rpm so as to facilitate the subsequent beam forming and pulse correlation operation. The beam forming operation is carried on at the beam forming station 58 wherein a plurality of different beam forming masks are stored on a thermoplastic film tape and the tape rolled in the form of a reel. This reel of thermoplastic film beam forming masks is then moved past the thermoplastic film disk 31 by a suitable high speed movie camera mechanism in accordance with a predetermined schedule as will be described more fully hereinafter. The beam forming operation carried out at the station 58 will serve to derive output electric signals representative of the target returns from each of the elemental beams in the aximuth fan. These signals are then supplied to either one of two write guns 75 and 76 which may be used in preference to the single gun and switching arrangement described with relation to FIG. 7, and each of which is identical in constuction to the write gun shown in FIG. 6. The pulse correlation write guns 75 and 76 then serve to write 200 tracks in concentric relation with the original recorded 100 tracks, and these 200 tracks will represent the beam formed signal outputs of 200 – 0.1° angular elements in a single azimuth fan. The beam formed signals thus written are then rotated past the pulse correlation readout optic system indicated at 62 where the correlation process is carried out for the purpose of distinguishing true target echo signals from irrelevant noise.

MOTOR DRIVE CONTROL

Optical readout for beam formation and for correlation requires that the incoming signal be recorded with a precise relation between recorded position on the thermoplastic film recording disk 31 and the time of reception. This requirement is reflected in the need for an accuracy of one part in 30,000 in the motor drive unit for the turntable 72 on which the thermoplastic film recording disk 31 is mounted. These accuracies apply only during the period when the drum is running at its slow recording speed of approximately one-twentieth of a revolution per minute to record the incoming signals. The requirements are less severe during the period when the drum is running at a high speed, approximately 300 rpm, for processing in the beam forming and pulse correlation operations. While these requirements are not too severe, they are beyond the capabilities of any open loop synchronous motor drive in view of the low rotational speed required for recording. A high performance servo system with feedback from the drum periphery is required in order to assure the kind of accuracy needed. Such systems are presently being produced by the General Electric Company, and are available commercially. One such system is the Mark 73 Director manufactured and sold by the Heavy Military Electronics Department of the General Electric Company shown schematically in FIG. 9 of the drawings. This system is built around a gearless drive motor 73,74 which is mechanically connected to the turntable 72 without gearing. By this arrangement gear backlash is eliminated from the servo system, thereby making possible servo gains much greater than those normally obtained with a geared system. The turntable 72 on which the thermoplastic film recording disk 31 is mounted, has a reference track 81 consisting of some 60,000 lines formed around its periphery. These reference marks are read out by an optical pickup device 82 positioned adjacent the tracks and which converts the marks to a reference electric signal that is fed through an appropriate frequency dividing circuit 83 back to an electronic tachometer circuit 84. The signal from the electronic tachometer is then supplied to a comparator circuit 85 along with a speed control voltage 80 used to set the speed of the system. The two voltage are compared in the comparator 85 and an error signal is developed which is supplied through a preamplifier 86 and power amplifier 87 back to the motor 73 to maintain its speed constant at the value set by the speed control voltage 80. It should be noted that the frequence divider 83 is required only during the high speed operation of the motor so that during the slow speed recording operation the frequency divider 83 would be normally by-passed by a by-pass switch 88. The above system comprises a more or less conventional speed control loop which is further improved by the addition of a second feedback through the conductor 89 to a phase comparator circuit 91. Also supplied to the phase comparator circuit 91 is a 50 cycle per second signal generated by a crystal controlled oscillator (not shown) which is extremely stable in operation. The phase comparator 91 serves to compare the signal supplied over the conductor 89 to the stabilized 50 cycle signal supplied from the oscillator, and to develop an error signal if there is a difference between the two voltages which is coupled back to the reference voltage comparator 85. In this manner, operation of the drum 31 can be locked in with the 50 cycle signal source. When converting the system to high speed operation for the beam forming and pulse correlation process, all that is required is to insert the frequency divider circuit 83 into the system, and to increase the speed control signal to bring the turntable speed within the high speed range of the system. Accordingly, it can be appreciated that the speed of the rotatable turntable. can be controlled within the available tolerances.

BEAM FORMING OPERATION

The principle behind the beam forming operation can be best understood in conjunction with FIGS. 10 through 14 of the drawings. In considering these figures, it should be remembered that a cycle of sound energy reflected from a target object in water returns toward the receiver with a curved wave-front. This curved wave-front will reach the receiver array elements at different times depending upon the three-dimensional geometry of the receiving array and the wave-front. Hence, a returning target echo signal will have different phase relations at the various receiving array elements. In order to maximize sensitivity of the system to this returning target echo, it is necessary to insert delays in the array element outputs in order to effect precise compensation for the differences in arrival times. Upon the appropriate family of delays being applied to the signals from all of the receiving array elements, all echoes from a given direction and range zone will add in phase. Echoes from any other direction will not be in phase and, hence, the array is made to be directional by forming beams with appropriate arrangement of receiver signal delays inserted in the optical readout. The present data processing system forms beams in a very simple and efficient manner. First, it should be remembered that the signals from each of the receiver array elements is recorded on an individual track on the thermoplastic film recording disk 31, and that the speed of rotation of the thermoplastic film recording disk past the writing gun 55 is accurately controlled so that there is a precise relation between the signal position on the disk 31 and the time of the arrival of the signal at its associated receiving array element. With a record thus obtained, it is then posible to insert accurate delays between the signal channels for beam forming purposes by reading out at different points on each set of tracks. The distance along the track represents the relative time of signal reception; thus, in order to form a beam, all that is necessary is to read all of the recorded tracks with a pattern of points where the arrival time differences between the points and hence the receiving array elements are compensated. In the present data processing system, thermoplastic film beam forming masks form the compensated pattern of points which are used to select the points of readout along the tracks. Each of these thermoplastic film beam forming masks is calibrated to insert the desired delays between the points of readout so as to achieve a desired beam forming effect. In the proposed system, a number of thermoplastic film beam forming masks are used sequentially to select the points of readout. For this purpose, a stationary optical system is used to project the image of a section of the 100 signal track recordings onto a selected mask which has been appropriately designed to cause the array of receiving elements to look at one particular angular increment. This arrangement is illustrated schematically in FIG. 13 of the drawings wherein a light source is caused to image light rays 101 through the light modifying tracks 35 on the recording disk 31 onto a beam forming mask 58. The beam forming mask 58 has been designed to appropriately select the points of readout of the record tracks 35 with a plurality of light modifying marks 102 whose character will be described more fully hereinafter. The light modifying marks 102 are positioned so that any light that is imaged thereon from the light modifying tracks 35 in the thermoplastic film recording medium 31, is refracted onto a collecting lens 103 which serves to then image the light onto an appropriate electro-optical converting device formed by a photocell 104. It can be appreciated that the light rays 101 from the stationary light source will be refracted by the light modifying tracks 35 in a manner determined by the phase relation of the light modifying tracks at this particular point of readout and the light modifying marks 102 in the thermoplastic film mask 58. Assuming that this phase relation is the proper one, then the light rays will be refracted through the collecting lens 103 and imaged upon the photocell 104 to generate an electric output signal representative of phase coincidence between the record tracks on the thermoplastic film recording medium 31 and the mask 58 at a particular point along the tracks. In order to scan the entire period of signal reception, the record tracks will be rotated through one complete revolution of the turntable 72 past the readout optics. Hence, the succession of returned signal tracks moving across the light modifying marks on the mask produces an alternating output voltage. Summation of the alternating components by a single phototube then provides an electric output signal which represents the result of scanning one angular increment in the field of view of the array of receiving elements.

In order to provide the thousands of masks in sequence required to read out each angular increment in the sector under surveillance, the appropriate beam forming patterns are recorded in succession on a strip 105 of thermoplastic film in the manner illustrated in FIG. 10 of the drawings. In FIG. 10 the thermoplastic film recording disk 31 is shown adjacent the strip 105 of thermoplastic film which has a succession of masks 58 formed thereon. The masks 58 are arranged in frames of four masks each frame being indicated by "Beam N," "Beam N+1," and "Beam N−1." The system is designed to index one frame of four masks each at the end of each revolution of the turntable 72, and it is proposed to change these frames by means of a high speed motion picture mechanism (not shown) on which the thermoplastic film 105 is mounted. The reason for arranging four thermoplastic film masks 58 together in a frame is connected with the problems of readout from the several range zones. As shown in FIG. 10, the thermoplastic film recording disk 31 is divided into four range zones starting with 31*a*, 31*b*, 31*c*, and 31*d*. Each of the range zones represents a particular range zone in the sector under surveillance. As discussed previously, these different range zones are required because a different mask pattern will be required for each of the range zones in a particular angular element being looked at. In other words, as stated earlier, the angular increments themseleves are range dependent so that in order to generate the proper phase relations in a mask, the mask itself must be designed for a particular range zone within the angular element under consideration. Accordingly, in the readout process, assuming that in the arrangement shown in FIG. 10 the mask marked "Beam N" is in use and that the thermoplastic film recording disk 31 is rotated counterclockwise, then in reading out the signal tracks in the range zone 31*a*, the mask 58*a* will be read out in reading out the range zone 31*b*, the mask 58*b* will be employed; and so on through one complete revolution of the thermoplastic recording disk 31. In order to distinguish the signals from each of the several range zones, a number of photocell readout devices will be employed, such as is illustrated in FIG. 11 of the drawings. In this arrangement, light rays indicated at 101 from the stationary light source will pass through the record tracks formed by the light modiifying marks 35 in the thermoplastic recording medium 31, and will be refracted by the light modifying marks in these tracks and directed to all masks 58*a* – 58*d* in the readout position noted by the frame marked "Beam N". Light thus refracted will then be directed simultaneously upon all the plurality of readout photocell devices 104*a*, 104*b*, 104*c*, and 104*d*. The electrical output signals generated by these devices are then supplied through a gating circuit 106 to the pulse correlation writing gun, as will be described more fully hereinafter. The gating circuit 106 is of conventional construction, and merely serves to gate on each of the photocells 104*a*, 104*b*, etc. in sequence in synchronism with the rotation of the thermoplastic recording disk 31. In this fashion, only the photocell 104*a* will be effective to supply an output signal while the range zone 31*a* is passing under the thermoplastic film mask tape 58, the photocell 104*b* will be effective only while the range zone 31*b* passes under the thermoplastic film mask 58, etc., and so on throughout a complete revolution of the thermoplastic recording disk 31. Upon completion of the read out of the frame marked "Beam N" at the end of the revolution of the disk 31, the high speed motion picture mechanism will step the tape one frame so as to position the next frame marked "Beam N+ 1" in the readout position occupied by Beam N as shown in FIG. 10.

The precise fabrication of the thermoplastic film beam forming masks is best shown in FIG. 12 and FIG. 12*a* of the drawings. Each of the beam forming masks 58*a*, 58*b*, 58*c*, and 58*d* of a single frame is formed by a series of light modifying marks 35 formed transverse to the axial direction of the tape in a predetermined pattern of points which have been selected to provide appropriate delays between the various points of readout on the record tracks of the thermoplastic film recording disk 31. There will be some 100 of these light modifying marks 35 extending in a direction transverse to the length of the tape so that a selected point on every track relative to the remaining tracks will be read out simultaneously as the record tracks on disk 31 are rotated under the mask. The character of the light modifying marks 35 is shown more clearly in FIG. 12*a* which is a greatly magnified view of the portion or segment of the mask 58b. From an examination of FIG. 12*a*, it can be appreciated that the light modifying marks 35 constitute apertures or slits which are generally rectangular in shape, and are approximately one hundredth of an inch in length, and 25 ten-thousandths of an inch in breadth. Some 100 of these marks placed essentially side-by-side will extend across only approximately an inch of the tape so that all 300 tracks to be formed on the thermoplastic film recording disk 31 in any one data processing operation can be accommodated on the approximately three to five inch wide annular disk 31. The marks 102 will be written on the thermoplastic film masks with an electron writer similar to the writer shown in FIG. 5 but modified to allow for deflection of the electron beam appropriate amounts in accordance with the desired delay patterns.

The details of construction of the optical system used to image the light passing through the track recordings upon the beam forming masks is illustrated in FIG. 14 of the drawings. In FIG. 14, a light source is positioned at 110 and 111, as shown, and light from this source passes through a field lens 112 which tends to collect the light and to image it on the thermoplastic film track record 31 as shown. Only that light which hits a light modifying mark 35 in the track record 31 will be refracted to impinge upon a projection lens 113 that is positioned intermediate a pair of stops 114. The projection lens 113 projects an image of the refracted light onto an anamorphic variable magnifying optical assembly comprised by a collecting lens 115, a movable magnifying lens 116, and a second projection lens 117. This movable magnifying lens assembly provides an anamorphic zoom feature that causes the image of the light modifying tracks 35 on the recording disk 31 to be magnified by varying amounts, depending upon the setting of the magnifying lens 116, to thereby increase the size of the image with respect to the size of the apertures or light modifying marks 102 in the thermoplastic film masks 58. Hence, light passing through the projection lens 113 is magnified a predetermined amount by the anamorphic zoom lens assembly, and imaged on the TPF mask 58. Light striking the light modifying marks 102 in the thermoplastic film mask 58 is again refracted, and passed through a collecting lens 118 which images the light thus refracted upon a pair of photodetectors 119 and 120. It is to be understood that there will be four sets of such projection lenses, together with their associated pairs of photodetectors 119, 120, and 118, with each set being positioned immediately in back of its respective thermoplastic film mask 58*a*, 58*b*, 58*c*, or 58*d*, as the case may be. For the purpose of convenience, however, only one such mask has been shown, it being understood that three additional masks could be arranged side-by-side into the plane of the paper. It can be appreciated from an examination of FIG. 14 that only the light rays which are deviated by the light modifying tracks 35 in the recording disk 31 will enter the projection lens 113 and thence pass through the anamorphic zoom lens assembly to be imaged on the mask 58. Again, only those light rays which strike one of the light modifying marks 102 on the masks 58 will be refracted and imaged by the second projection lens 118 upon the photodetectors 119 or 120 to thereby produce an output electric signal representative of the fact that coincidence exists between the light modifying tracks 35 on the recording disk 31 and the light modifying marks 102 on the thermoplastic film mask 58 at this particular point along the length of the record tracks on disk 31. It should be noted at this point that the purpose of the varying magnification provided by the movable magnifying lens 116 is to insert into the data processing system at this point a means for correcting for changes in the velocity of sound in the water in which the sonar pulse has been transmitted. It is known that due to varying sound transmission qualities because of salinity and other characteristics of sea water, the velocity of sound will vary widely. In order to correct for this variation, the anamorphic zoom lens assembly 115–117 has been included at this point. The function of the anamorphic zoom lens assembly is to magnify or demagnify to increase or decrease with respect to a standard size the size of the image of the light modifying track 35 on the thermoplastic film disk 31. This magnification or demagnification, as the case may be, is in the direction of movement of the tracks so as to affect the phase relation of the image of the track with respect to the light modifying mark 102 on the mask 58. In this manner, corrections can be made for variations in the velocity of sound in a particular sector in which the data processing system is being operated.

The manner in which the anamorphic zoom lens assembly operates to correct the phase relation of the image of the light modifying tracks 35 with respect to the light modifying marks 102 on the mask 58 can best be visualized with respect to FIG. 14*a* of the drawings. In FIG. 14*a*, one of the light modifying marks 102 on the thermoplastic film mask 58 is shown schematically. Adjacent this mark or aperture, as one chooses to visualize it, is a shaded area 35' representing the light image of the light modifying mark 35 on the thermoplastic film recording disk 31. Assuming this size 35' of this image to be standard or normal size image, then in subsequent views the image 35'' has been increased by adjustment of the magnification provided by the magnifying lens 116 so as to increase the size of the image and thereby change the phase relation of the image with respect to the mark 102. This phase relation change occurs by reason of the fact that the larger sized image 35'' will, in effect, reach the mark 102 at a point earlier in time along the length of the track than the normal size imaged, and, in this fashion, correction can be made for changes in the velocity of the sonar sound wave in the various sectors in which the data processing system might be used. In 35'', this phase relation is shown to be retarded by demagnifying the size of the image so that it, in fact, will reach the mark 102 at a point in time later along the length of the track than the normal sized image as the record disk 31 is rotated past the beam forming mask 58.

PULSE CORRELATION

The output electric signals developed by the above described beam forming operation will be supplied back to the two pulse correlation electron writing guns, as described with relation to FIG. 8 of the drawings which will record the output signals on a number of separate tracks concentric with the originally recorded 100 tracks. There will be one track for each angular element considered in one azimuth fan so that there will be essentially 200 tracks in the outermost zone. In order to eliminate interference, false echo, and other extraneous noise pulses appearing in the beam formed output signal, it is necessary to correlate these 200 beam formed output signal tracks with the originally coded transmitted sonar signal. For this purpose the pulse correlation operation is provided, and after the correlation of these 200 beam formed tracks is completed, all of the tracks may be erased and a new set of incoming signals recorded and processed. The function of the correlation process is to compare the beam formed track records obtained from the input signals supplied from the receiving array elements with the coded transmitted sonar signal. The coding and optics are designed to produce a short signal pulse when the pulse of the returned signal picked up by the receiving array elements corresponds closely to the phase of the coded, long transmitted, sonar pulse. The method employed is to project an image of the moving 200 track beam formed record upon a mask which has been designed with slits representing the code relations. In order to achieve maximum output at coincidence, it is necessary to compare the recorded beam formed signal tracks with the replica of the coded, transmitted sonar pulse at all points over the entire pulse length. To accomplish this, two masks are used in an arrangement such as that shown in FIG. 15 of the drawings. Referring to FIG. 15, the thermoplastic film recording disk 31 is illustrated as having a plurality of additional tracks 125 of light modifying marks formed therein, which tracks represent the beam formed signals resulting from the beam forming operation described above and re-recorded on the thermoplastic film disk 31 in concentric relation with the originally recorded 100 tracks. There will be some 200 of these beam formed tracks resulting from the beam forming operation, although only a partial number of such tracks are illustrated in FIG. 15. Light from a light source, not shown, directs its light rays 131 through the 200 beam formed tracks simultaneously, and the light rays refracted from the light modifying marks 125 in the recording disk 31 are imaged on a beam splitting device 132 which comprises a conventional light optic device for dividing a light image supplied thereto into two separate paths. One of the light images developed by the beam splitting device 132 is imaged on a first correlation mask 62*a*, having light modifying marks 133 formed therein in a positive replica of the positive polarities of the coded, transmitted, long sonar pulse. The remaining light image developed by the beam splitting device 132 is imaged on a second mask 62*b*, having light modifying marks 133 formed therein, in a negative replica of the positive polarities of the transmitted, coded sonar pulse. Hence, the positive masks 62*a* will have light modifying marks or slits 133 formed therein where positive signal polarities exist in the transmitted, coded sonar pulse, and the negative mask 62*b* will have no light modifying marks or slits 133 formed therein at points where positive polarities exist in the transmitted, coded sonar pulse. The beam splitting device 132 images a replica of the beam formed returned signal represented by the tracks 125 on disk 31 on both of the masks 62*a* and 62*b* and where light rays hit one of the light modifying tracks 133, it will be refracted by the mask to impinge upon a separate photodetector device 134 in the case of the positive mask 62*a*, or a photodetector device 135 associated with the negative mask 62*b*. By this arrangement, the average output of each of the phototubes 134 and 135 will be one-half of the maximum possible output. It should be noted at this point that the photodetectors 134 and 135 are represented only schematically since in an actual embodiment of the invention there will be a separate photodetector for each track of light modifying marks 125 in the thermoplastic recording disk 31. The schematic arrangement of FIG. 15 is believed adequate, however, to explain the mode of operation of the circuit. In operation, the continuous noise contained in the record tracks will cause some of the light modifying marks 125 in the record track 31 to correspond to mask slits 133 in both the positive and negative masks 62*a* and 62*b* over approximately one-half the total length of the slits 133 along the tracks. The precise nature of the masks 62*a* and 62*b* is best illustrated in FIG. 16*a* and FIG. 16*b* of the drawings, wherein it can be seen that the mask 62*a* differentiates from the beam forming masks used in the beam forming operation, in that the light modifying marks 133 in addition to running across the width of the mask so that there will be a mark for each of the record tracks on the disk 31, the marks 133 also extend along the length of the tracks for a period representative of the period of the transmitted coded sonar pulse. Accordingly, it can be appreciated from an examination of FIG. 16*a* that in the case of the positive masks 62*a*, there will be a light modifying mark or slit 133 at each of the points along the length of the mask which correspond with the positive polarity point on the coded, transmitted, sonar signal. The reverse of this situation is true with respect to the negative mask 62*b*. That is to say, at those points which ordinarily correspond to positive polarity pulse points on the coded, transmitted, sonar signal, there is no mark or slit 133 in the negative mask. Because of this arrangement, the signal outputs from the photodetector device 134, 135 will appear as shown in FIG. 16*c* in curves A and B, respectively. From an examination of curve A, it can be seen that the continuous noise present along the length of the record track will cause some background potential to appear as to 136. This background potential may be due to scratches and the like on the surface of the record track 31 which causes some small amount of light to be transmitted through the light modifying marks 133 on both of the masks 62*a* and 62*b* to develop the background noise signal 136 at the output of each of the phototubes 134 and 135. However, upon the appearance of a positive polarity pulse, a positive voltage pulse will appear as at 137 in the output of photodetector 134 due to the fact that a greater proportion of the light will be directed through the marks 133 in the positive mask 62*a*. With regard to the negative mask 62*b*, however, the output of the photodetector 135 is shown in the curve B. In a fashion similar to the positive mask, the photodetector 135 will provide a background signal level 136 due to the noise present on the record track. However, upon the occurrence of a positive polarity signal pulse in the coded, transmitted, sonar signal, as evidenced by a mark 125 on the record of track 31, substantially all the light will be refracted to a position corresponding to a point where a slit 133 should be. There will be no light modifying mark or slit 133 in the negative mask at these points so that the noise level will drop to the point 138 as shown in curve B. Upon combining the two signal outputs from the photodetectors 134 and 135, the result will be to subtract the transient noise level or background potentials in a manner to emphasize the presence of a positive polarity pulse in the incoming received sonar signal, as shown at 139 in curve A minus B.

The manner in which the signals from the two photodetectors 134 and 135 are combined is best shown in FIG. 17 of the drawings, wherein the output of the photodetector 134 is supplied to an adding circuit 141 directly while the output of the photodetector 135 is supplied through an inverting circuit 142 of conventional construction to the adder circuit 141. The output of the adder circuit 141 may then be supplied to the data recorder to record the correlated output from the correlation operation. Since the construction of the inverter circuit 142 and the adder circuit 141 is conventional in nature, it is not believed necessary to disclose these items in detail. In operation, the inverter circuit 142 serves to invert the signal generated by photodetector 135 some 180° so that when the signals are added together by adding circuit 141, the effect obtained is a substraction of the signal developed by the photodetector 135 from the signal developed by the photodetector 134.

Another feature shown in FIG. 17 of the drawings which was not described with relation to FIG. 15 is the addition of an anamorphic zoom lens assembly, shown schematically at 144, which serves as a Doppler scan for the pulse correlation system. The precise construction of this Doppler scan lens assembly is illustrated in FIG. 18 of the drawings, and will be described more fully hereinafter. However, its location in the pulse correlation optic system is shown in FIG. 17 for explanatory purposes. As discussed previously, coincidence can occur between two signals being correlated only if they are very nearly of the same length, and their positive polarities have the same phase relation. Phase shifts which are caused by target motion can change the length of the received sonar signal pulses being supplied from the receiving array elements. In order to compensate for this effect, in the present system it is possible to vary the relative lengths of the mask apertures and the returned signal record by a magnification control in the pulse correlation optics. This magnification control is done mechanically along one axis only; i.e., along the axis of the record movement to provide an anamorphic zoom similar to that discussed earlier with relation to the beam forming optics system, described more fully in a U.S. Pat. application Ser. No. 160,699 (General Electric Patent Docket 14D–1725) filed concurrently herewith, entitled "Signal Correlation System" D. E. Wood and W. T. Gannon, Inventors, assigned to General Electric Company. Thus by increasing the magnification of the pulse correlation optics in stepped increments, a different Doppler frequency increment can be processed on each succeeding revolution of the record track 31. Complete scanning over the Dopper range can be accomplished in as many drum revolutions as there are Doppler increments in the Doppler frequency range. It is, of course, necessary that all 200 tracks be scanned simultaneously for any given Doppler increment so as to minimize the number of operations required for a complete Doppler scan. The exact number of Doppler increments depends upon the length of the coded, transmitted, sonar pulse and the optimum width of the Doppler frequency increment. It has been estimated that with a 100-cycle modulation band pass, and a coded, transmitted sonar pulse having a pulse length of 60 seconds, assuming a maximum Doppler shift of plus or minus two percent due to target motion, as many as 1,000 Doppler increments may have to be processed. For shorter, coded, transmitted, sonar pulses, the number of these increments could be reduced proportionately. Also, the choice of 200 tracks for the correlation process is somewhat arbitrary for the specific system described. The 200 tracks were used to achieve reasonably short signal processing time, and because this number also corresponded to the maximum number of azimuth increments in a complete azimuth fan to facilitate recording. As discussed earlier, upon completion of the pulse correlation of the complete azimuth fan the elevational angle of look of the receiving array would be stepped up two-tenths of a degree in elevation until the entire sector under surveillance had been scanned. It is, of course, necessary that the results from each azimuth fan be recorded in the output data recorder prior to increasing the elevation increment being looked at.

As shown in FIG. 18 of the drawings, the light optics required for pulse correlation includes a light source 145 which produces light rays shown at 146 that are collected by a collecting lens 147 and imaged on the thermoplastic film record disk 31. Light rays which strike the tracks of light modifying marks 125 on disk 31 are refracted to an angle that will make them strike a projection lens 152. Light rays reaching the projection lens 152 are then imaged through a Doppler scan lens assembly comprised by a collecting lens 115, an adjustable magnifying lens 116, and a projection lens 117 that projects the light onto the beam splitting device 132. The beam splitting device 132 then serves to split the light image into two parts and image them upon either the positive mask 62*a* or the negative mask 62*b*, not shown. The negative mask 62*b* has not been shown as a matter of convenience, and it is to be understood that the physical relations depicted by the schematic optical system of FIG. 18 are not precise and in an actual physical embodiment of the optical system the parts would be arranged differently from those illustrated. After passing through the beam splitting device 132, one light beam is imaged on the positive mask 62*a*, for example, where that light which hits one of the light modifying marks 133 is refracted so as to be imaged on a light separating device 153. This light separating device 153 will comprise some 200 light pipes 154, each of which comprises a straight piece of glass rod for transmitting the light down its length, and each of which has a photo-diode device 155 positioned adjacent its output end. By this arrangement, light which is refracted by any one of the 200 tracks of light modifying marks 125 on the record disk 31 will be imaged through the projection lens, the Doppler scan lens assembly, and the beam splitting device upon a corresponding track of light modifying marks 133 in the mask 62*a*. Light refracted by the selected track of light modifying marks 133 will then travel down its respective light pipe 154 to be imaged on the output photodiode 155 associated with that particular light pipe. In this manner, an output electric signal will be produced to indicate correlation between the particular track of light modifying marks on the record disk 31 and the coded, transmitted, sonar signal insofar as that particular track is concerned. Scanning of all 200 tracks is carried out simultaneously in one revolution of the thermoplastic film recording disk 31 for any one Doppler increment.

As discussed previously, however, Doppler shifts caused by target motion can change the length of the received signal pulses. In order to correlate signals where target motion is predicted, it is necessary to vary the relative lengths of the light modifying marks or apertures in the mask 62*a* or 62*b*, and the image of the signal record by means of the magnification control provided by the anamorphic zoom, Doppler scan assembly. Hence, it is possible by incremental adjustments to the magnification provided by the anamorphic zoom lens assembly to process a different Doppler increment for each revolution of the drum. By providing as many incremental changes in the magnification of the anamorphic zoom lens assembly as there are Doppler increments to be scanned, it is then possible to carry out a complete Doppler scan of the signals being processed simultaneously with the correlation of these signals with the coded transmitted signal. It may be necessary to carry out as many as 1,000 Doppler increments, hence requiring some 1,000 rotations of the thermoplastic film recording disk 31. It is then possible for the output signals generated for each Doppler scan to be separately recorded on the thermoplastic film output data recorder so as to allow for subsequent study of each Doppler increment contained in all 200 azimuth elemental angles in the azimuth fan being processed. It is also desirable that simultaneous presentation of the results of the Doppler scan be available for instantaneous visual recognition of the output signal to determine if targets are present.

OUTPUT DATA RECORDER

In the proposed data processing system, data will be supplied simultaneously from 200 channels of correlation output for each revolution of the thermoplastic film recording disk 31. Assuming that there are some 1,000 Doppler elements to be considered, and that the frequency of readout signals in each channel will be about 1 megacycle, the combination of the many channels and high frequency creates quite a problem in data recording. Conventional recording techniques are inadequate or impractical for this purpose and, therefore, thermoplastic film tape data recording, such as that described in the above-identified copending Glenn application, will be used to record the output data in a fashion that preserves the high resolution of the over-all system. If each resolution element of angle, range, and Doppler were to be recorded on a separate unit of recording area, there would be a considerable accumulation of data requiring some 750,000 feet of thermoplastic film tape alone. In order to avoid such accumulation of recorded data, the present system accomplishes a compression of data by the repeated use of one record and erasing after the purpose of the recording has been served. This is done by recording the output data from the correlation process on a thermoplastic tape wrapped about a drum. This drum rotates in synchronism with the thermoplastic film recording disk 31 during the pulse correlation process and will have recording channels for azimuth, elevation and Doppler increments. For illustration, there will be some 200 azimuth angles and 50 elevation angles. With this arrangement, the 200 azimuth tracks can be connected to the 200 correlation outputs, and whichever elevation track represents the current angle of look of the receiving element array would be coupled to all 200 azimuth inputs. Whenever a signal output is supplied from the threshold detector connected to the outputs of the photodetectors 155 in the pulse correlation stage, this signal output is written on both the corresponding azimuth and elevation tracks. Since the point of recording on the thermoplastic tape corresponds to the relative range of the echo source, according to whatever range interval is being processed, the need for separate range records is thus obviated. In addition to the above, another section of the data recorder will provide channels for the Doppler increments. It may not be necessary to have as many tracks as there are possible Doppler increments, since a lesser number of increments might yield a sufficiently close indication for one to calibrate the target velocity. Hence, it is proposed that only some 50 Doppler channels be recorded, and that these 50 channels be spread throughout the complete range in accordance with the established rules of sampling theory. It is believed that the compression of the data in the above described manner will not result in any great reduction in the resolution of the system.

The construction of the output data recorder is illustrated schematically in FIG. 19 of the drawings. Since the function of this unit is to provide a high resolution recording of the outputs from the data processing previously described, the unit must be capable of recording some 300 tracks in the output recording. For this purpose the recorder employs three of the 100 channel write guns 161, 162, and 163, which are identical in construction to the write guns described with relation to FIG. 8 of the drawings. These writing guns are positioned adjacent a wide thermoplastic film tape 164, which is supported on sprockets 165 secured around the circumference of a drum 166 that is rotated in synchronism with the thermoplastic film recording disk 31. The thermoplastic film tape 164 is perforated on each of its sides so that it can be secured to the sprocket pins 165 of the drum 166 readily, and yet be removed with a minimum of trouble. The three 100 channel write guns 161–163 are designed to write 300 tracks of data simultaneously as the drum 166 is rotated in synchronism with the thermoplastic film recording disk 31 during the correlation process. Signals are supplied to the three write guns 161–163 by a track assignment control circuit 167 having its input connected to the output of the threshold detector supplied from the photodetectors in the pulse correlation stage. The track assignment control circuit 167 then serves to direct data to the tracks corresponding to the current part of the search cycle being processed. When the output recording is complete for one complete azimuth fan, the tape 164 can be removed and placed on a reel for projection in a data display unit such as that described in the above-identified copending Glenn application. It is, of course, necessary that a replacement tape be put in its place to record the next azimuth fan in the sector being searched. Since there is adequate time during the recording phase of the data processing system operation; i.e., when the initial incoming signals are being recorded on the first 100 tracks of the thermoplastic film recording disk 31, this requirement of removal of the output data recording tape 164 works no great hardship. It is, of course, necessary that the data written on the thermoplastic film tape 164 by the write guns 161–163 be developed prior to removal of the tape for subsequent projection and, for this purpose, a radiant heating coil 168 is provided within the vacuum-tight enclosure 169, in which the write guns 161 through 163 are disposed. Accordingly, after the data has been written on the thermoplastic film tape 164, the continuing rotation of the tape will bring the area of the tape on which the data has been written under the radiant heating coil 188 where the heat, due to the coil, will form the permanent depressions or light modifying marks due to the electrons written thereon. A conventional vacuum pump arrangement shown at 171 serves to maintain the entire housing 169 under a vacuum.

SIGNAL INPUT CHANNEL

A functional block diagram of the signal input channels, which are of conventional construction, is shown in FIG. 20. The function of the signal input circuits is to amplify the incoming sonar signals from each receiving array element, and clip the low frequency signals so that only polarity information is left. This clipped or hard limited signal is then used to control the writing gun to give a full write beam output when the signal is positive, and no writing when the signal is negative. For this purpose, the signals from the hydrophones on the receiving towers are amplified and filtered in a typical signal channel such as shown in FIG. 20. The incoming signal from each array element is first supplied to a 400-cycle per second filter 171 which has a bandwidth of approximately 120 cycles per second to accommodate the signal frequencies, plus or minus 2 percent Doppler shifts. The purpose of filter 171 is to attenuate noise components outside of the signal frequency band. The output from the filter 171 is supplied to a three-stage limiter 176 which clips the signal symmetrically above and below zero reference level. It is preferred that the three-stage limiter which employs biased diodes be used to provide the clipping operation, and that high gain amplifier stages be used between the clippers to assure adequate clipping for the smallest signal expected. A final clamped amplifier stage may be used at the output of the three-stage limiter to raise the signal level from the final diode clipper to approximately 20 volts peak-to-peak in order to assure adequate drive for the electron gun writer described with relation to FIG. 6 of the drawings.

The output electric signals developed by the earlier described beam forming operation ordinarily will be supplied to a pulse correlation stage as discussed above, where, in order to eliminate interference, false echo and other extraneous noise appearing in the beam formed signals, it is necessary to correlate the beam formed signal with the originally coded transmitted signal. Hence, the function of the correlation operation is to compare the beam formed signals obtained in the beam forming operation with a replica of the coded transmitted signal. The preferred method of correlating the beam formed signals as described earlier is to project an image of the beam formed signals upon a mask which has been designed with slits or light modifying marks defining a replica of the coded transmitted signal. When the phase relations are proper, a light image is caused to fall upon a photocell output circuit thereby producing an output electric signal which indicates that the phase of the beam formed signals picked up by the receiving array elements corresponds closely to the phase of the coded transmitted signal. In order to achieve maximum output at coincidence, that is, when correlation between the two signals being compared occurs, it is necessary to compare the recorded beam formed signals with the replica of the coded transmitted signal at all points over the entire length of the coded transmitted signal. The method discussed earlier accomplishes this in a separate pulse correlation operation. It is also feasible to accomplish the beam forming operation and correlation of the signal returns with the coded transmitted signal, simultaneously. In order to perform simultaneous beam forming and signal correlation, it is necessary to substitute in place of the mask shown in FIG. 12 of the drawings a mask shown such as that in FIG. 21 of the drawings. From a comparison of the masks shown in FIG. 12 and FIG. 21, it can be appreciated that the mask shown in FIG. 12 is one dimensional only, while the mask shown in FIG. 21 is two dimensional. In the mask shown in FIG. 12 the light modifying marks 102 extend only across the width of the mask ignoring, of course, the appropriate displacement required in the direction of movement of the track being read out to achieve a preselected delay of the point of readout of a track record with which it is used. The mask shown in FIG. 21 is two-dimensional in that a replica of the coded transmitted signal with which correlation is sought is formed along the X axis of the mask which extends in the direction of movement of the track being read out, and is the same for all tracks being examined. It should be noted, however, that the replica of the coded transmitted signal, formed along each of the tracks, is shifted with respect to its adjacent track in accordance with the beam forming delays required with the particular angular element and range zone under surveillance. Accordingly, as one traces across the Y axis of the mask shown in FIG. 21, it will be noted that the replicas of the coded transmitted signal will be shifted by amounts indicated by the brackets marked /Delay/ with respect to adjacent tracks to thereby incorporate the desired beam forming delays.

In operation, the masks shown in FIG. 21 of the drawings will be substituted for the mask 58 in the optical system shown in FIG. 14 of the drawings. The system will then function precisely as described with relation to FIG. 14 of the drawings to develop output electric signals in the output photocells. These output signals will represent not only the beam formed signals derived from the signal inputs from the array elements, but also the correlated output signals representing maximum coincidence points where the phase of the returned signal picked up by the receiving array elements corresponds closely to the phase of the replica of the coded transmitted signal. These beam formed, correlated output signals may then be recorded on the output data recorder in the manner previously described where they may be used for display or further study. It should be noted, however, that the anamorphic zoom lens assembly 115, 116, and 117 will have to be adjusted to provide not only the velocity correction, but also the Doppler scan. This can be accomplished by setting the center of Doppler spectrum at a value which corrects for velocity changes in the transmitting medium as described earlier. Additionally, attention is invited to the fact that each combined beam forming and pulse correlation mask will have to be processed as many times as there are Doppler increments. Accordingly, it can be appreciated that each beam will have to be separately scanned for each Doppler increment, in contrast to the preferred arrangement where 200 beams are simultaneously scanned for a single Doppler increment.

From the foregoing description, it can be appreciated that the invention makes available a data processing system for processing large quantities of data with relatively simple and efficient apparatus employing a recording medium that can be readily erased and rerecordings made thereover. Accordingly, having described one embodiment of a data processing system constructed in accordance with the invention, it is believed obvious that other modifications and variations of the present invention are possible in the light of the above teachings. It is, therefore, to be understood that changes may be made in the particular embodiment of the invention described which are within the full intended scope of the invention as defined by the appended claims.

What I claim as new and desire to secure by Letters Patent of the U.S. is:

1. A data processing system including in combination:

1. first recording means for receiving and recording on a recording medium the signal inputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array,
2. a first light source positioned adjacent the recording medium for imaging a light beam through the tracks on the medium,
3. beam forming mask means positioned over said recording medium for disposing over the recorded tracks in a selected sequence masks representing optimum signal output from each elemental point of a selected range of view of the array of signal pick-up devices,
4. first electro-optical conversion means for converting the light passing through both the record track and the mask into an electric output signal representative of coincidence between the mask and the track record at points where such coincidence occurs,
5. second recording means operatively coupled to said first electro-optical conversion means for recording on a recording medium a plurality of tracks of light modifying marks representative of the output signals generated by the beam forming process from each elemental point examined,
6. a second light source positioned to direct light through the last mentioned recording medium at least in the portion where said light modifying tracks are formed,
7. a mask having a coded series of light modifying marks formed thereon representing the signal with which correlation is sought,
8. optical means for optically imaging the light passing through all of the tracks of light modifying marks in the recording medium upon the mask, 9. light separating means having the light images that have passed through both said recording medium and said mask impinging thereon for separating the light images from each of the individual tracks, and 10. second electro-optical converting means for each of the individual tracks having said separated light beams imaged thereon for converting the light image into output electric signals representative of correlation between the mask and individual tracks on the recording medium.

2. A data processing system including in combination:

1. first recording means for receiving and recording on a recording medium the signal inputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array, 2. a first light source positioned adjacent the recording medium for imaging a light beam through the tracks on the medium,
3. beam forming mask means positioned over said recording medium for disposing over the recorded tracks in a selected sequence masks representing optimum signal output from each elemental point of a selected range of view of the array of signal pick-up devices,
4. first electro-optical conversion means for converting the light passing through both the record track and the mask into an electric output signal representative of coincidence between the mask and the track record at points where such coincidence occurs,
5. second recording means operatively coupled to said first electro-optical conversion means for recording on a recording medium a plurality of tracks of light modifying marks representative of the output signals generated by the preceeding beam forming process from each elemental point examined,
6. a second light source positioned to direct light through the last mentioned recording medium at least in the portion where said light modifying tracks are formed,
7. a mask having a coded series of light modifying marks formed thereon representing the signal with which correlation is sought,
8. optical means for optically imaging the light passing through all of the tracks of light modifying marks in the recording medium upon the mask,
9. said optical means including image magnifying means,
10. means for varying the magnification of said image magnifying means whereby the size of the light image of the light modifying marks on the recording medium is varied with respect to the size of the light modifying marks on said mask,
11. light separating means having the light images that have passed through both said recording medium and said mask impinging thereon for separating the light images from each of the individual tracks, and
12. second electro-optical converting means for each of the individual tracks having said separated light beams imaged thereon for converting the light image into an output electric signal representative of correlation between the mask and the tracks on the recording medium.

3. A data processing system including in combination:

1. first recording means for receiving and recording on a recording medium the signal inputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array, 2. a first light source positioned adjacent the recording medium for imaging a light beam through the tracks on the medium,
3. beam forming mask means positioned over said recording medium for disposing over the recorded tracks in the selected sequence masks representing optimum signal output from each elemental point of a selected range of view of the array of signal pick-up devices,
4. first optical means positioned intermediate the beam forming mask means and the recording medium for imaging light passing through the light modifying marks in the recording medium onto the masks,
5. said first optical means including image magnifying means,
6. means for varying the magnification of said image magnifying means whereby the size of the light image of the light modifying marks on the recording medium is varied with respect to the size of the light modifying marks on the mask whereby corrections can be made for changes in velocity of the signals being processed due to different characteristics of the media through which such signals passed,
7. first electro-optical conversion means for converting the light passing through both the record track and the mask into an electric output signal representative of coincidence between the mask and the track record at points where such coincidence occurs,
8. second recording means operatively coupled to said first electro-optical conversion means for recording on a recording medium a plurality of tracks of light modifying marks representative of the output signals generated by the preceding beam forming process from each elemental point examined,
9. a second light source positioned to direct light through the last mentioned recording medium at least in the portion where said light modifying tracks are formed,
10. a mask having a coded series of light modifying marks formed thereon representing the signal with which correlation is sought,
11. second optical means for optically imaging the light passing through all of the tracks of light modifying marks in the recording medium upon the mask, 12. said second optical means including image magnifying means, 13. means for varying the magnification of said image magnifying means whereby the size of the light image of the light modifying marks on the recording medium is varied with respect to the size of the light modifying marks on said mask, 14. light separating means having the light images that have passed through both said recording medium and said mask impinging thereon for separating the light images from each of the individual tracks, and 15. second electro-optical converting means for each of the individual tracks having said separated light beams imaged thereon for converting the light image into an output electric signal representative of correlation between the mask and the tracks on the recording medium.

4. A data processing system including in combination:

1. recording means for receiving and recording on a recording medium the signal inputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array, 2. a light source positioned adjacent the recording medium for imaging a light beam through the tracks on the medium, 3. beam forming mask means positioned over said recording medium for disposing over the recorded tracks in a selected sequence masks representing optimum signal output from each elemental point of a selected range of view of the array of signal pick-up devices, 4. optical means positioned intermediate the beam forming mask means and the recording medium for imaging light passing through the light modifying marks in the recording medium onto the masks, 5. said optical means including image magnifying means, 6. means for varying the magnification of said image magnifying means whereby the size of the light image of the light modifying marks on the recording medium is varied with respect to the size of the light modifying marks on the mask whereby corrections can be made for changes in velocity of the signals being processed due to different characteristics of the media through which such signals passed, and 7. electro-optical conversion means for converting the light passing through both the record track and the mask into an electric output signal representative of coincidence between the mask and the track record at points where such coincidence occurs.

5. A data processing system including in combination:

1. first recording means for receiving and recording in real time on a recording medium the signal inputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array over a predetermined period of time with all of the tracks being divided into four different range zones representative of four different distance range zones covered by the view of the array, 2. means for moving said recording medium past said first recording means at a rate related to the timing of the signals being received by the array of signal input devices, said moving means having means for increasing the rate of movement of said recording medium to a second predetermined rate during the subsequent beam forming and correlation processes, 3. a first light source positioned adjacent the recording medium for imaging a light beam through the tracks on the medium, 4. beam forming mask means positioned over said recording medium for disposing over the recorded tracks in a selected sequence masks arrangaed in predetermined groups with each mask representing optimum signal output from a predetermined range zone of each elemental azimuth beam of a selected azimuth fan viewed by the array of signal 5. first optical means positioned intermediate the beam forming mask means and the recording medium for imaging light that passes through the light modifying marks in the recording medium onto the beam forming masks, 6. said first optical means including image magnifying means, 7. means for varying the magnification of said image magnifying means whereby the size of the light image of the light modifying marks on the recording medium is varied with respect to the size of the light modifying marks on the mask whereby corrections can be made for changes in velocity of the signals being processed due to different characteristics of the media through which such signals passed, 8. first electro-optical conversion means for converting the light passing through both the record track and the mask into an electric output signal representative of coincidence between the mask and the track record at points where such coincidence occurs, 9. second recording means operatively coupled to said first electro-optical conversion means for the recording on a recording medium a plurality of tracks of light modifying marks representative of the output signals generated by the preceding beam forming process from each elemental point examined in the selected azimuth fan viewed by the array, 10. a second light source positioned to direct light through the last mentioned recording medium at least in the portion where said light modifying tracks are formed, 11. a mask having a coded series of light modifying marks formed thereon representing the signal with which correlation is sought, 12. second optical means for optically imaging the light passing through all the tracks of light modifying marks in the recording medium upon the mask, 13. said second optical means including image magnifying means, 14. means for varying the magnification of said image magnifying means whereby the size of the light image of the light modifying marks on the recording medium is varied with respect to the size of the light modifying marks on said mask to thereby accomplish a Doppler scan of the signals being correlated, 15. light separating means having the light images that have passed through both said recording medium and said mask impinging thereon for separating the light images from each of the individual tracks, and 16. second electro-optical converting means for each of the individual tracks having separated light beams imaged thereon for converting the light image into an output electric signal representative of correlation between the mask and the tracks on the recording medium.

6. The combination set forth in claim 4 wherein the recording means in real time over a predetermined period of time with all of the tracks being divided into four different range zones representative of four different distance range zones covered by the view of the array, and wherein the masks are arranged in predetermined groups with each representing the optimum signal output from a predetermined range zone of each elemental azimuth beam of a selected azimuth fan viewed by the array of signal pickup devices, and wherein a combination is further characterized by means for moving the recording medium past the recording means at a rate related to the timing of the signals being received by the array of signal input devices, said moving means also having means for increasing the rate of movement of said recording medium to a second predetermined rate during the subsequent beam forming and correlation processes.

7. A data processing system including in combination:

1. first recording means for receiving and recording on a thermoplastic film recording medium the signal inputs from an array of signal input devices, said thermoplastic film recording medium being adapted to have its light modifying characteristics changed by said recording means by electron writing in accordance with the signal inputs to said recording means whereby a plurality of tracks of light modifying marks are recorded on the thermoplastic film recording medium with each track of marks representing the signal supplied from one signal input device of the array, 2. a first light source positioned adjacent the thermoplastic film recording medium for imaging a light beam through the tracks on the medium, 3. thermoplastic film beam forming mask means positioned over said recording medium for disposing over the recorded tracks in a selected sequence theremoplastic film masks representing optimum signal output from each elemental beam of a selected azimuth fan viewed by the array of signal pick-up devices, 4. first electro-optical conversion means for converting the light passing through both the record track and the mask into an electric output signal representative of coincidence between the mask and the track record at points where such coincidence occurs, 5. second recording means operatively coupled to said first electro-optical conversion means for recording the thermoplastic film recording medium a plurality of tracks of light modifying marks representative of the output signals generated by the preceding beam forming process from each elemental beam examined, 6. a second light source positioned to direct light through the last mentioned recording medium at least in the portion where said light modifying tracks are formed, 7. a mask having a coded series of light modifying masks formed thereon representing the signal with which correlation is sought, 8. optical means for optically imaging the light passing through all of the tracks of light modifying marks in the recording medium upon the mask, 9. said optical means including image magnifying means, 10. means for varying the magnification of said image magnifying means whereby the size of the light image of the light modifying marks on the recording medium is varied with respect to the size of the light modifying marks on said mask, 11. light separating means having the light images that have passed through both said recording medium and said mask impinging thereon for separating the light images from each of the individual tracks, 12. second electro-optical converting means for each of the individual tracks having said separated light beams imaged thereon for converting the light image into an output electric signal representative of correlation between the mask and the tracks on the recording medium, and 13. a thermoplastic film data recorder operatively coupled to said second electro-optical converting means for recording on a thermoplastic recording medium the correlated output signals from the correlation process whereby in repeated operations and by stepping up the azimuth fan being viewed by the incremental angles of elevation a three dimensional scan of the area being monitored can be obtained.

8. A data processing system including in combination:

1. first recording means for receiving and recording in real time on a thermoplastic film recording medium the signal inputs from an array of signal input devices, said thermoplastic film recording medium being adapted to have its light modifying characteristics changed by said recording means by electron writing in accordance with the signal inputs to said recording means whereby a plurality of tracks of light modifying marks are recorded on the thermoplastic film recording medium with each track of marks representing the signal supplied from one signal input device of the array over a predetermined period of time, with all the tracks being divided into four different range zones representative of four different distance range zones covered by the view of the array, 2. means for moving said recording medium past said first recording means at a rate related to the timing of the signals being received by the array of signal input devices, said moving means having means for increasing the rate of movement of said recording medium to a second predetermined rate during the subsequent beam forming and correlation processes,
3. a first light source positioned adjacent the thermoplastic film recording medium for imaging a light beam through the tracks on the medium,
4. thermoplastic film beam forming mask means positioned over said recording medium for disposing over the recorded tracks in a selected sequence thermoplastic film masks representing optimum signal output from each elemental beam of a selected azimuth fan viewed by the array of signal pick-up devices,
5. first optical means positioned intermediate the beam forming mask means and the recording medium for imaging light that passes through the light modifying marks in the thermoplastic film recording medium onto the beam forming masks,
6. said first optical means including image magnifying means,
7. means for varying the magnification of said image magnifying means whereby the size of the light image of the light modifying marks on the recording medium is varied with respect to the size of the light modifying marks on the mask whereby corrections can be made for changes in velocity of the signal being processed due to different characteristics of the media through which such signals passed,
8. first electro-optical conversion means for converting the light passing through both the record track and the mask into an electric output signal representative of coincidence between the mask and the track record at points where such coincidence occurs,
9. second recording means operatively coupled to said first electro-optical conversion means for recording on a thermoplastic film recording medium a plurality of tracks of light modifying marks representative of the output signals generated by the preceding beam forming process from each elemental beam examined in the selected azimuth fan viewed by the array,
10. a second light source positioned to direct light through the last mentioned recording medium at least in the portion where said light modifying tracks are formed,
11. a mask having a coded series of light modifying marks formed thereon representing the signal with which correlation is sought,
12. second optical means for optically imaging the light passing through all of the tracks of light modifying marks in the recording medium upon the mask,
13. said optical means including image magnifying means,
14. means for varying the magnification of said image magnifying means whereby the size of the light image of the light modifying marks on the recording medium is varied with respect to the size of the light modifying marks on said mask to thereby accomplish a Doppler scan of the signals being correlated,
15. light separating means having the light images that have passed through both said recording medium and said mask impinging thereon for separating the light images from each of the individual tracks,
16. second electro-optical converting means for each of the individual tracks having said separated light beams imaged thereon for converting the light image into an output electric signal representative of correlation between the mask and the tracks on the recording medium, and
17. a thermoplastic film data recorder operatively coupled to said electro-optical converting means for recording on a thermoplastic film recording medium the correlated output signals from the correlation process whereby in repeated operations and by stepping up the azimuth fan being viewed by incremental angles of elevation a three dimensional record of the area being viewed by the array can be obtained.

9. A data processing system including in combination:

1. first recording means operatively coupled to an array of signal input devices for individually recording the signal inputs from each signal input device in the array,
2. a rotatable turntable having a surface formed of a thermoplastic film recording medium of the type adapted to have its light modifying characteristics changed by recording thereon by electron writing in intelligence conveying patterns,
3. said rotatable turntable being positioned in recording relation with respect to said first recording means whereby a plurality of parallel tracks of light modifying marks are formed in the thermoplastic film recording medium peripherally around the turntable with each track of marks representing the signal supplied from one signal input device of the array,
4. a first light source positioned adjacent the turntable for imaging a light beam through the tracks on the turntable,
5. beam forming mask means positioned over the tracks in the turntable for disposing over the tracks in a selected sequence masks representing optimum signal output from each elemental point of a selected range of view of the array of signal pick-up devices,
6. first electro-optical conversion means for converting the light passing through both the record tracks and the beam forming masks into an electric output signal representative of coincidence between the masks and the track record at points where such coincidence occurs,
7. second recording means operatively coupled to said first electro-optical conversion means for recording a second set of parallel tracks of light modifying marks on the thermoplastic film surface of the turntable, said second set of tracks being representative of the output signals generated by the preceding beam forming operation with each track being representative of the signal returned from each elemental point of the range of view of the array, 8. a second source positioned to direct light through the last mentioned set of tracks on said turntable as the turntable is rotated,
9. a mask having a coded series of light modifying marks formed thereon representing the signal with which correlation is sought,
10. optical means for optically imaging the light passing through the second set of tracks of light modifying marks upon said last mentioned mask,
11. said optical means including image magnifying means,
12. means for varying the magnification of said image magnifying means whereby the size of the light image of the light modifying marks on the turntable is varied with respect to the size of the light modifying marks on the mask to thereby accomplish a Doppler scan of the correlated signal,
13. light separating means having the light images that have passed through both said recording medium and said mask impinge thereon for separating the light images from each of the individual tracks, and
14. second electro-optical converting means for each of the individual tracks having said separated light beams imaged thereon for converting the light image into an output electric signal representative of correlation between the mask and the tracks on the recording medium.

10. A data processing system including in combination:

1. signal processing circuits for amplifying and limiting the signal inputs from an array of signal input devices,
2. first recording means operatively coupled to said signal processing circuits for individually recording in real time the signal inputs from each signal input device in the array over a predetermined period of time with all the tracks being divided into a plurality of different range zones representative of an equal number of different distance range zones covered by the view of the array,
3. a rotatable turntable having a surface formed of a thermoplastic film recording medium of the type adapted to have its light modifying characteristics changed by recording thereon by electron writing in intelligence conveying patterns,
4. said rotatable turntable being positioned in recording relation with respect to said first recording means whereby a plurality of parallel tracks of light modifying marks are formed in the recording medium periphery around the turntable with each track of marks representing the signal supplied from one signal input device of the array,
5. means for rotating said turntable at a first rate related to the timing of the signals being received by the array of signal input devices, said rotating means having means for increasing the rate or rotation of said turntable to a second predetermined rate during the subsequent beam forming and correlation processes,
6. a first light source positioned adjacent the recording medium for imaging a light beam through the tracks on the turntable,
7. thermoplasttc film beam forming mask means positioned over said tracks in the turntable for disposing over the tracks in a selected sequence thermoplastic film masks arranged in predetermined groups with each mask representing optimum signal output from a predetermined range zone of each elemental azimuth beam of a selected azimuth fan viewed by the array of signal pick-up devices,
8. first electro-optical conversion means for converting the light passing through both the record tracks and the beam forming masks into an electric output signal representative of coincidence between the masks and the track record at points where such coincidence occurs,
9. second recording means operatively coupled to said first electro-optical conversion means for recording a second set of parallel tracks of light modifying marks on the thermoplastic film surface of the turntable, said second set of tracks being representative of the output signals generated by the preceding beam forming operation with each track being representative of the signal returned from each elemental point of the range of view of the array,
10. a second light source positioned to direct light through the last mentioned set of tracks on said turntable as the turntable is rotated,
11. a mask having a coded series of light modifying marks formed thereon representing the signal with which correlation is sought,
12. optical means for optically imaging the light passing through the second set of tracks of light modifying marks upon said last mentioned mask,
13. said optical means including image modifying means,
14. means for varying the magnification of said image magnifying means whereby the size of the light image of the light modifying marks on the turntable is varied with respect to the size of the light modifying marks on the mask to thereby accomplish a Doppler scan of the correlated signal,
15. light separating means having the light images that have passed through both said recording medium and said mask impinge thereon for separating the light images from each of the individual tracks, and
16. second electro-optical converting means for each of the individual tracks having said separated light beams imaged thereon for converting the light image into an output electric signal representative of correlation between the mask and the tracks on the recording medium.

11. A data processing system including in combination:

1. first recording means operatively coupled to an array of signal input devices for individually recording the signal inputs from each signal input device in the array,
2. a rotatable turntable having a surface formed of a thermoplastic film recording medium of the type adapted to have its light modifying characteristics changed by recording thereon by electron writing in intelligence conveying patterns,
3. said rotatable turntable being positioned in recording relation with respect to said first recording means whereby a plurality of parallel tracks of light modifying marks are formed in the thermoplastic film recording medium periphery around the turntable with each track of marks representing the signal supplied from one signal input device of the array, 4. a first light source positioned adjacent the turntable for imaging a light beam through the tracks on the turntable,
5. beam forming mask means positioned over the tracks in the turntable for disposing over the tracks in a selected sequence masks representing optimum signal output from each elemental point of a selected range of view of the array of signal pick-up devices,
6. first optical means positioned intermediate the beam forming mask means and the turntable for imaging light passing through the light modifying marks in the turntable onto the masks,
7. said first optical means including image magnifying means,
8. means for varying the magnification of said image magnifying means whereby the size of the light image of the light modifying marks on the recording medium is varied with respect to the size of the light modifying marks on the mask whereby corrections can be made for changes in velocity of the signals being processed due to different characteristics of the media through which such signals pass,
9. first electro-optical conversion means for converting the light passing through both the record tracks and the beam forming masks into an electric output signal representative of coincidence between the masks and the track record at points where such coincidence occurs,
10. second recording means operatively coupled to said first electro-optical conversion means for recording a second set of parallel tracks of light modifying marks on the thermoplastic film surface of the turntable, said second set of tracks being representative of the output signals generated by the preceding beam forming operation with each track being representative of the signal returned from each elemental point of the range of view of the array,
11. a second light source positioned to direct light through the last mentioned set of tracks on said turntable as the turntable is rotated,
12. a mask having a coded series of light modifying marks formed thereon repesenting the signal with which correlation is sought,
13. second optical means for optically imaging the light passing through the second set of tracks of light modifying marks upon said last mentioned mask,
14. said second optical means including second image magnifying means,
15. means for varying the magnification of said second image magnifying means whereby the size of the light image of the light modifying marks on the turntable is varied with respect to the size of the light modifying marks on the mask to thereby accomplish a Doppler scan of the correlated signal,
16. light separating means having the light images that have passed through both said recording medium and said mask impinge thereon for separating the light images from each of the individual tracks, and
17. second electro-optical converting means for each of the individual tracks having said separated light beams imaged thereon for converting the light image into an output electric signal representative of correlation between the mask and the tracks on the recording medium.

12. The combination set forth in claim 10 further characterized by:

1. additional optical means positioned intermediate the beam forming mask means and the turntable for imaging light passing through the light modifying marks in the turntable onto the masks,
2. said optical means including image magnifying means,
3. means to vary the magnification of said image magnifying means whereby the size of the light image of the light modifying marks on the recording medium is varied with respect to the size of the light modifying marks on the mask whereby corrections can be made for changes in velocity of the signals being processed due to the different characteristics of the media through which they pass, and
4. a thermoplastic film data recorder operatively coupled to said electro-optical converting means for recording on a thermoplastic film recording medium the correlated output signals from the preceding correlation operation whereby in repeated operation and by stepping up the azimuth fan being viewed by incremental angles of elevation a three dimensional record of an area being viewed by the array of signal input devices can be obtained.

13. A data processing system including in combination:

1. signal processing circuits for amplifying and limiting the signal inputs from an array of signal input devices,
2. first recording means operatively coupled to said signal processing circuits for individually recording in real time the signal inputs from each signal input device in the array over a predetermined period of time with all the tracks being divided into a plurality of different range zones representative of an equal number of different distance range zones covered by the view of the array,
3. a rotatable turntable having a surface formed of a thermophastic film recording medium of the type adapted to have its light modifying characteristics changed by recording thereon by electron writing in intelligence conveying patterns,
4. said rotatable turntable being positioned in recording relation with respect to said first recording means whereby a plurality of parallel tracks of light modifying marks are formed in the recording medium periphery around the turntable with each track of marks representing the signal supplied from one signal input device of the array,
5. means for rotating said turntable at a first rate related to the timing of the signals being received by the array of signal input devices, and rotating means having means for increasing the rate of rotation of said turntable to a second predetermined rate during the subsequent beam forming and correlation process,
6. a first light source positioned adjacent the recording medium for imaging a light beam through the tracks on the turntable, 7. thermoplastic film beam forming mask means positioned over said tracks in the turntable for disposing over the tracks in a selected sequence thermoplastic film masks arranged in predetermined groups with each mask representing optimum signal output from a predetermined range zone of each elemental azimuth beam of a selected azimuth fan viewed by the array of signal pick-up devices, 8. first electro-optical conversion means for converting the light passing through both the record tracks and the beam forming masks into an electric output signal representative of coincidence between the masks and the track record at points where such coincidence occurs, 9. second recording means operatively coupled to said first electro-optical conversion means for recording a second set of parallel tracks of light modifying marks on the thermoplastic film surface of the turntable, said second set of tracks being representative of the output signals generated by the preceding beam forming operation with each track being representative of the signal returned from each elemental point of the range of view of the array, 10. a second light source positioned to direct light through the last mentioned set of tracks on said turntable as the turntable is rotated, 11. a pair of masks each having a coded series of light modifying marks formed thereon representing the positive of the signal with which correlation is sought on one and the negative of the signal with which correlation is sought on the remaining mask, 12. optical means for optically imaging the light passing through the second set of tracks of light modifying marks upon said last mentioned mask, 13. said optical means including a beam splitting device for optically splitting the light image coming from the light modifying tracks in the thermoplastic film turntable into two light images, and imaging the split images on the respective masks, 14. said optical means further including image magnifying means, 15. means for varying the magnification of said image modifying means whereby the size of the light image of the light modifying marks on the turntable is varied with respect to the size of the light modifying marks on the masks to thereby accomplish a Doppler scan of the correlated signal, 16. light separating means having the light images that have passed through both said recording medium and said masks impinge thereon for separating the light images from each of the individual tracks, 17. second electro-optical converting means for each of the individual tracks having said separated light beams imaged thereon for converting the light images into an output electric signal representative of correlation between the masks and the tracks on the recording medium, 18. an inverter circuit electrically coupled to the second electro-optical converting means responsive to the light images that have passed through the negative mask, and 19. an adding circuit electrically coupled to the second electro-optical converting means responsive to the light images that have passed through the positive mask and also electrically coupled to the output of said inverter circuit for deriving an output electric signal representative of correlation between the masks and the tracks on the recording medium.

14. The combination set forth in claim 13 further characterized by:

1. additional optical means positioned intermediate the beam forming mask means and the turntable for imaging light passing through the light modifying marks in the turntable onto the masks,
2. said optical means including image magnifying means,
3. means to vary the magnification of said image magnifying means whereby the size of the light image of the light modifying marks on the turntable is varied with respect to the size of the light modifying marks on the masks whereby corrections can be made for changes in velocity of the signals being processed due to the different characteristics of the media through which they pass, and
4. a thermoplastic film data recorder operatively coupled to the output of said adding circuit for recording on a thermoplastic film recording medium the correlated output signals from the preceding correlation operation whereby in repeated operation and by progressively stepping up the azimuth fan being viewed by incremental angles of elevation a three dimensional record of an area being viewed by the array of signal input devices can be obtained.

15. The method of beam forming and correlating signals received by an array of signal pick-up devices comprising recording the signals picked up by the array in real time on a plurality of tracks on a moving recording medium wherein each track represents the signal picked up by a respective pick-up device in the array, projecting a beam of light through the record, disposing over the recorded tracks in a selected sequence masks which have a coded series of light modifying marks formed therein which represent optimum signal ouput with which correlation is sought from each elemental point of a selected range of view of the array of signal pick-up devices, and converting the light images passing through both the record track and the masks into an electric output signal representative of correlation between the mask and the track record at points where such correlation occurs.

16. Apparatus for beam forming and correlating signals received from an array of signal pick-up devices including in combination:

1. recording means for receiving and recording on a recording medium the signal inputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array, 2. a light source positioned adjacent the recording medium for imaging a light beam through the tracks on the medium, 3. beam forming and correlation mask means positioned over said recording medium for disposing over the recorded tracks in a selected sequence masks which have a coded series of light modifying marks formed therein which represent optimum signal output with which correlation is sought from each elemental point of a selected range of view of the array of signal pick-up devices, and
4. electro-optical conversion means for converting the light passing through both the record track and the mask into an electric output signal representative of coincidence between the mask and the track record at points where such coincidence occurs.

17. Apparatus for beam forming and correlating signals received from an array of signal pick-up devices including in combination:

1. recording means for receiving and recording on a recording medium the signal inputs from an array of signal input devices, said recording medium being adapted to have its light modifying characteristics changed by said recording means in accordance with the signal inputs to said recording means whereby a plurality of tracks of light modifying marks are recorded on the recording medium with each track of marks representing the signal supplied from one signal input device of the array,
2. a light source positioned adjacent the recording medium for imaging a light beam through the tracks on the medium,
3. beam forming and correlation mask means positioned over said recording medium for disposing over the recorded tracks in a selected sequence masks which have a coded series of light modifying marks formed therein which represent the optimum signal output with which correlation is sought from each elemental point of a selected range of view of the array of signal pick-up devices,
4. optical means positioned intermediate the beam forming mask and correlation means and the recording medium for imaging light passing through the light modifying marks in the recording medium onto the masks,
5. said optical means including image magnifying means,
6. means for varying the magnification of said image magnifying means whereby the size of the light image of the light modifying marks on the recording medium is varied with respect to the size of the light modifying marks on the mask to thereby accomplish a Doppler scan of the signal being correlated,
7. an electro-optical conversion means for converting the light passing through both the record track and the mask into an electric output signal representative of correlation between the mask and the track record at points where such correlation occurs.

18. Apparatus for beam forming and correlating signals received from an array of signal pick-up devices including in combination:

1. recording means operatively coupled to an array of signal pick-up devices for individually recording the signal inputs from each signal input device in the array over a predetermined time period with all the tracks being divided into a plurality of different range zones representative of an equal number of different distance range zones covered by the view of the array,
2. a rotatable turntable having a surface formed of a thermoplastic film recording medium of the type adapted to have its light modifying characteristics changed by recording thereon by electron writing in intelligence conveying patterns,
3. said rotatable turntable being positioned in recording relation with respect to said first recording means whereby a plurality of parallel tracks of light modifying marks are formed in the recording medium periphery around the turntable with each track of marks representing the signal supplied from one signal input device of the array,
4. a light source positioned adjacent the recording medium for imaging a light beam through the tracks on the turntable,
5. a beam forming and correlation mask means positioned over said tracks in the turntable for disposing over the tracks in a selected sequence masks which have a coded series of light modifying marks formed therein which represent the optimum signal output with which correlation is sought from a predetermined range zone of each elemental point of a selected range of view of the array of signal pick-up devices, and
6. electro-optical conversion means for converting the light passing through both the record tracks and the beam forming masks into an electric output signal representative of coincidence between the masks and the track record at points where such coincidence occurs.

* * * * *